(12) United States Patent
Kano et al.

(10) Patent No.: US 11,807,556 B2
(45) Date of Patent: Nov. 7, 2023

(54) METHOD FOR PRODUCING ULTRAPURE WATER

(71) Applicant: Merck Patent GmbH, Darmstadt (DE)

(72) Inventors: Ichiro Kano, Montigny le Bretonneux (FR); Gabriela Dima, Villebon sur Yvette (FR); Julien Gross, Elancourt (FR); Yann Ratieuville, Paris (FR)

(73) Assignee: Merck Patent GmbH, Darmstadt (DE)

( * ) Notice: Subject to any disclaimer, the term of this patent is extended or adjusted under 35 U.S.C. 154(b) by 534 days.

(21) Appl. No.: 16/481,547

(22) PCT Filed: Feb. 12, 2018

(86) PCT No.: PCT/EP2018/053442
§ 371 (c)(1),
(2) Date: Jul. 29, 2019

(87) PCT Pub. No.: WO2018/146310
PCT Pub. Date: Aug. 16, 2018

(65) Prior Publication Data
US 2020/0024157 A1    Jan. 23, 2020

(30) Foreign Application Priority Data
Feb. 13, 2017    (EP) .................................... 17290018

(51) Int. Cl.
*C02F 1/42*    (2023.01)
*B01J 47/127*    (2017.01)
(Continued)

(52) U.S. Cl.
CPC .................. *C02F 1/42* (2013.01); *B01J 47/04* (2013.01); *B01J 47/127* (2017.01); *C02F 1/283* (2013.01);
(Continued)

(58) Field of Classification Search
None
See application file for complete search history.

(56) References Cited

U.S. PATENT DOCUMENTS

| 4,421,652 A | 12/1983 | Heskett |
| 4,430,226 A | 2/1984 | Hegde et al. |
(Continued)

FOREIGN PATENT DOCUMENTS

| CA | 2960152 A1 | 3/2016 |
| CN | 1829563 A | 9/2006 |
(Continued)

OTHER PUBLICATIONS

AmberLite IRA410 Product Data Sheet, by DuPont, published Nov. 2019, obtained from Web Jan. 12, 2022, 3 total pages. (Year: 2022).*

(Continued)

*Primary Examiner* — Jonathan M Peo
(74) *Attorney, Agent, or Firm* — NIELDS, LEMACK & FRAME, LLC

(57) ABSTRACT

The present invention relates to a method for producing purified water comprising a step (a) of passing water through a mixed bed ion exchanger comprising beads having a diameter between 0.2 and 0.7 mm and a step (b) of passing water through a fibrous ion-exchange material. The invention further relates to a module comprising the mixed bed ion exchange resin and the fibrous material and to a water treatment system for producing ultrapure water comprising the mixed bed ion exchange resin and the fibrous material.

17 Claims, 23 Drawing Sheets

(51) Int. Cl.
  *B01J 47/04* (2006.01)
  *C02F 1/28* (2023.01)
  *C02F 1/44* (2023.01)
  *C02F 1/469* (2023.01)
  *C02F 103/04* (2006.01)

(52) U.S. Cl.
  CPC ............ *C02F 1/441* (2013.01); *C02F 1/4695* (2013.01); *C02F 2001/427* (2013.01); *C02F 2103/04* (2013.01)

(56) References Cited

U.S. PATENT DOCUMENTS

| | | | |
|---|---|---|---|
| 5,022,994 | A | 6/1991 | Avery et al. |
| 5,073,268 | A | 12/1991 | Saito et al. |
| 5,250,187 | A | 10/1993 | Franks |
| 5,464,532 | A | 11/1995 | Nowlin et al. |
| 5,552,056 | A * | 9/1996 | Ragosta ............... B01J 47/133 210/660 |
| 5,645,727 | A | 7/1997 | Bhave et al. |
| 5,868,924 | A | 2/1999 | Nachtman et al. |
| 7,670,676 | B2 | 3/2010 | Horiishi et al. |
| 9,023,185 | B2 | 5/2015 | Gifford et al. |
| 2002/0026675 | A1 | 3/2002 | Kravtchenko et al. |
| 2002/0179508 | A1 | 12/2002 | Nachtman et al. |
| 2003/0127388 | A1 | 7/2003 | Ando et al. |
| 2007/0151924 | A1 | 7/2007 | Mir et al. |
| 2008/0041790 | A1 | 2/2008 | Rajan et al. |
| 2008/0210606 | A1 | 9/2008 | Burbank et al. |
| 2008/0264868 | A1 | 10/2008 | Murray et al. |
| 2008/0314763 | A1 | 12/2008 | Saito et al. |
| 2009/0008318 | A1 | 1/2009 | Anes et al. |
| 2009/0101586 | A1 | 4/2009 | Brings et al. |
| 2009/0218289 | A1 | 9/2009 | Brings et al. |
| 2010/0130626 | A1 | 5/2010 | Fukui et al. |
| 2011/0245127 | A1 | 10/2011 | Suzuki et al. |
| 2014/0263072 | A1 | 9/2014 | Voigt et al. |
| 2015/0238908 | A1 | 8/2015 | Ding et al. |
| 2015/0315055 | A1 | 11/2015 | Chidambaran et al. |
| 2016/0115046 | A1 | 4/2016 | Gifford et al. |
| 2016/0229711 | A1 | 8/2016 | Boodoo et al. |
| 2018/0057370 | A1 | 3/2018 | Lin |
| 2018/0214845 | A1 | 8/2018 | Gluckman et al. |
| 2019/0217250 | A1 | 7/2019 | Ichihara et al. |
| 2019/0314806 | A1 | 10/2019 | Slagt et al. |
| 2020/0024155 | A1 | 1/2020 | Kano et al. |
| 2020/0024156 | A1 | 1/2020 | Kano et al. |
| 2020/0189938 | A1 | 6/2020 | Kano et al. |

FOREIGN PATENT DOCUMENTS

| | | |
|---|---|---|
| CN | 202246289 U | 5/2012 |
| CN | 202297292 U | 7/2012 |
| CN | 202881021 U | 4/2013 |
| CN | 103359850 A | 10/2013 |
| CN | 103370283 A | 10/2013 |
| CN | 105036412 A | 11/2015 |
| EP | 0429661 A1 | 6/1991 |
| EP | 0880469 B1 | 3/2000 |
| EP | 1533033 A1 | 5/2005 |
| JP | 60-71098 A | 4/1985 |
| JP | 60-232208 A | 11/1985 |
| JP | 61-106306 A | 5/1986 |
| JP | 62-11593 A | 1/1987 |
| JP | 62-87702 A | 4/1987 |
| JP | 63-44988 A | 2/1988 |
| JP | 63-156591 A | 6/1988 |
| JP | 3-4345 Y2 | 2/1991 |
| JP | 3-151092 A | 6/1991 |
| JP | 4-78483 A | 3/1992 |
| JP | 4-244289 A | 9/1992 |
| JP | 4-293581 A | 10/1992 |
| JP | 10-216721 A | 8/1998 |
| JP | 3128249 B2 | 1/2001 |
| JP | 2001-515397 A | 9/2001 |
| JP | 2003-251118 A | 9/2003 |
| JP | 2003-266069 A | 9/2003 |
| JP | 2008-272713 A | 11/2008 |
| JP | 2009-541032 A | 11/2009 |
| JP | 2010-158606 A | 7/2010 |
| WO | WO-9729048 A1 * | 8/1997 ............. C02F 1/003 |
| WO | 98/09916 A1 | 3/1998 |
| WO | 03/072221 A1 | 9/2003 |
| WO | 2005/011849 A2 | 2/2005 |
| WO | 2009/075666 A2 | 6/2009 |
| WO | 2013/151654 A1 | 10/2013 |
| WO | 2016/128107 A1 | 8/2016 |

OTHER PUBLICATIONS

Chinese communication, with English translation, dated Aug. 13, 2021 in corresponding Chinese patent application No. 201880011711.5.
Japanese communication, with English translation, dated Oct. 1, 2021 in co-pending Japanese patent application No. 2019-543835.
Office action dated Sep. 17, 2021 in co-pending U.S. Appl. No. 16/481,544.
Dupont, Amberlite IRN 150 Product Data Sheet, 2020.
Lenntech Lewatit UltraPure 1292 MD Product Information, Oct. 13, 2011.
European communication dated Apr. 1, 2021 in corresponding European patent application No. 18703356.8.
European communication dated Jul. 1, 2021 in co-pending European patent application No. 18703355.0.
Office action dated Nov. 10, 2021 in co-pending U.S. Appl. No. 16/481,539.
Kun et al., "The Pore Structure of Macroreticular Ion Exchange Resins", Journal of Polymer Science, No. 16, pp. 1457-1469, 1967.
Office action dated Dec. 1, 2020 in co-pending U.S. Appl. No. 16/481,544.
International Search Report and Written Opinion dated Apr. 20, 2018 in co-pending PCT application No. PCT/EP2018/053439.
International Search Report and Written Opinion dated Mar. 26, 2018 in co-pending PCT application No. PCT/EP2018/053441.
International Search Report and Written Opinion dated Apr. 20, 2018 in co-pending PCT application No. PCT/EP2018/053467.
International Search Report and Written Opinion dated May 7, 2018 in corresponding PCT application No. PCT/EP2018/053442.
Lanxess "Product Information Lewatit NM 60 SG" Jan. 17, 2012.
Miller et al., "Understanding Ion-Exchange Resins for Water Treatment Systems", Suez Water Technologies, Feb. 1981.
European communication dated Mar. 25, 2021 in co-pending European patent application No. 18703354.3.
Dowex Monosphere MR-3 UPW: A Separable Uniform Particle Size Mixed Bed Ion Exchange Resin for Ultrapure Water Production, Mar. 1, 2007, https://www.lenntech.com/Data-sheets/Dowex-Monosphere-MR-3-UPW-L.pdf.
Office action dated Jun. 15, 2021 in co-pending U.S. Appl. No. 16/481,545.
Lenntech—Rohm and Haas Amberlite IRN150 Product Data Sheet, 2021.
Office Action dated Apr. 14, 2021 in co-pending U.S. Appl. No. 16/481,539.
Final Rejection dated Apr. 14, 2021 in co-pending U.S. Appl. No. 16/481,544.
Final rejection dated Aug. 19, 2021 in co-pending U.S. Appl. No. 16/481,539.
Japanese communication, with English translation, dated Nov. 26, 2021 in corresponding Japanese patent application No. 2019-543291.
Japanese communication, with English translation, dated Nov. 9, 2021 in co-pending Japanese patent application No. 2019-543202.
European communication dated Feb. 4, 2022 in co-pending European patent application No. 18703607.4.
Japanese communication, with English translation, dated Jul. 4, 2022 in co-pending Japanese patent application No. 2019-543835.

(56) References Cited

OTHER PUBLICATIONS

Final Rejection dated May 17, 2022 in co-pending U.S. Appl. No. 16/481,539.
Final Rejection dated Mar. 16, 2022 in co-pending U.S. Appl. No. 16/481,544.
Guojian, Functional Polymer Materials, Second Edition, Tongji University Press, Jun. 1, 2014.
Chinese communication, with English translation, dated Apr. 19, 2022 in co-pending Chinese patent application No. 201880011740.1.
The Examiner's attention is drawn to co-pending U.S. Appl. No. 16/481,539, filed Jul. 29, 2019 by Kano et al., and the Office actions and references cited therein.
The Examiner's attention is drawn to co-pending U.S. Appl. No. 16/481,544, filed Jul. 29, 2019 by Kano et al., and the Office actions and references cited therein.
The Examiner's attention is drawn to co-pending U.S. Appl. No. 16/481,545, filed Jul. 29, 2019 by Kano et al., and the Office actions and references cited therein.
Final rejection dated Feb. 3, 2022 in co-pending U.S. Appl. No. 16/481,545.
Lanxess Sybron, "Product Information Ionac NM-60 SG", <http://lewatit.co.kr/pop/pdf/NM60SG.pdf>, Apr. 26, 2011.
Notice of Allowance dated Aug. 24, 2022 in co-pending U.S. Appl. No. 16/481,545.
Office action dated Dec. 7, 2022 in co-pending U.S. Appl. No. 16/481,539.
Office action dated Oct. 19, 2022 in co-pending U.S. Appl. No. 16/481,544.
Horie et al., Definitions of Terms Relating to Reactions of Polymers and to Functional Polymeric Materials. Pure Appl. Chem., 76(4);889-906, 2004.
European communication dated Jun. 15, 2023 in corresponding European patent application No. 18703356.8.
Final Rejection dated Jun. 23, 2023 in co-pending U.S. Appl. No. 16/481,544.
Notice of Allowance dated Aug. 7, 2023 in co-pending U.S. Appl. No. 16/481,539.

\* cited by examiner

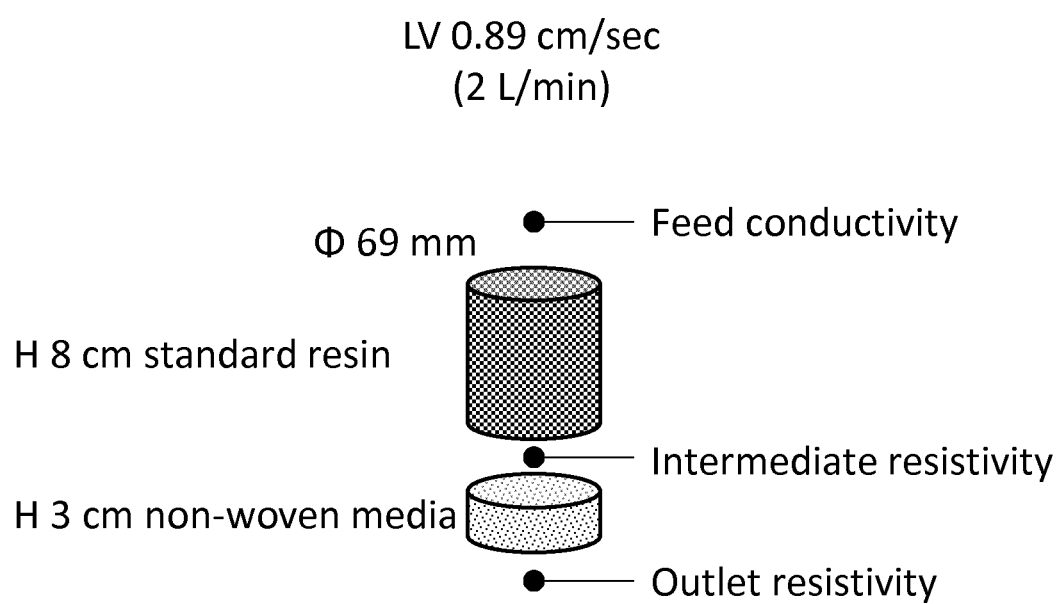
Fig. 5.1

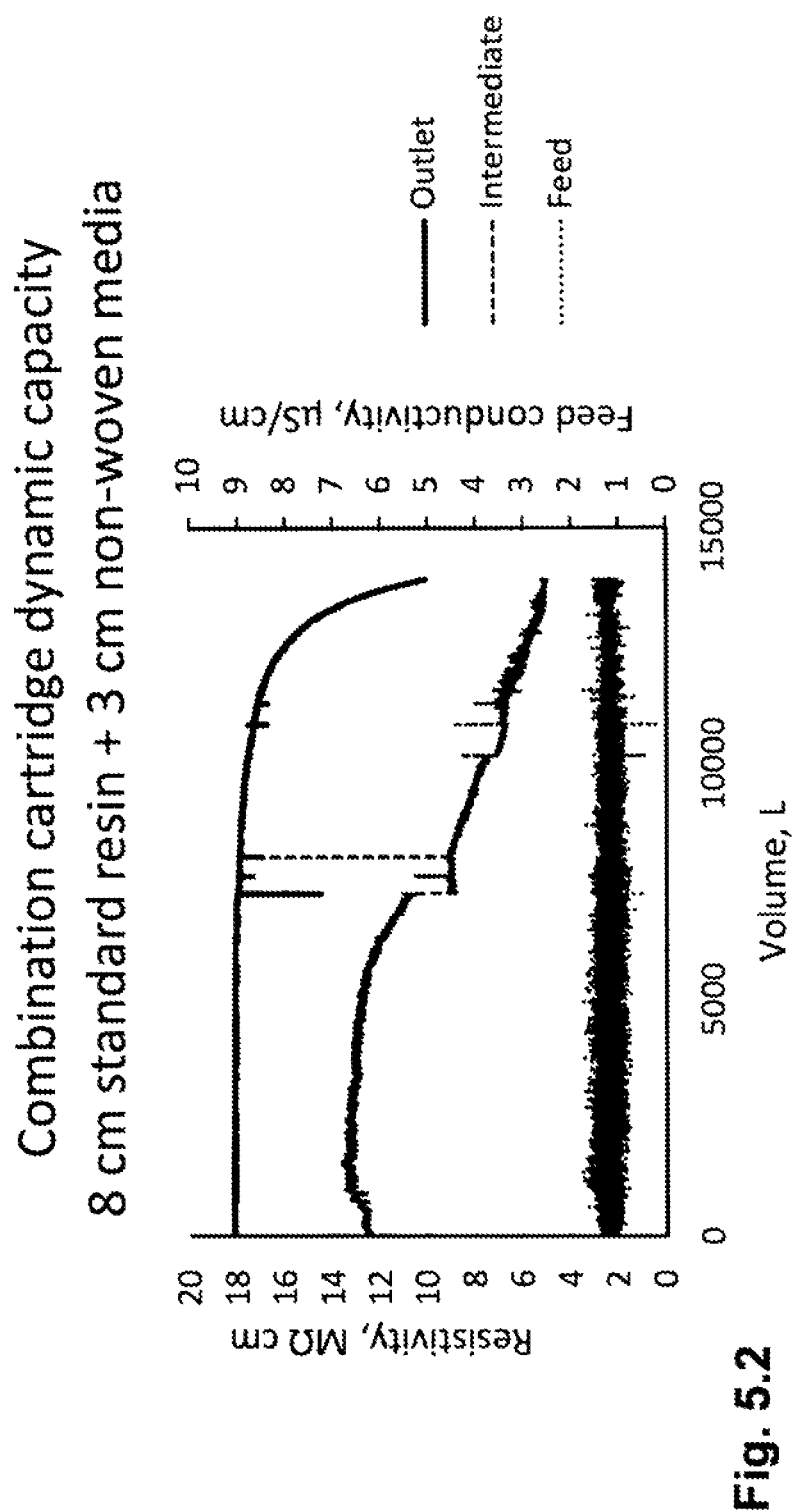
Fig. 5.2

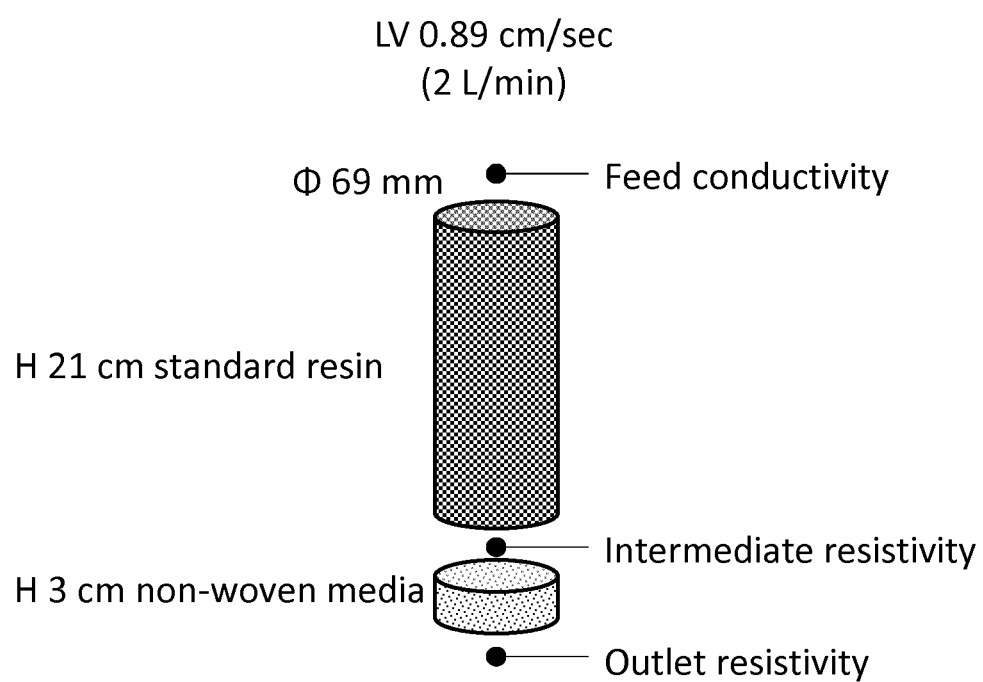
Fig. 6.1

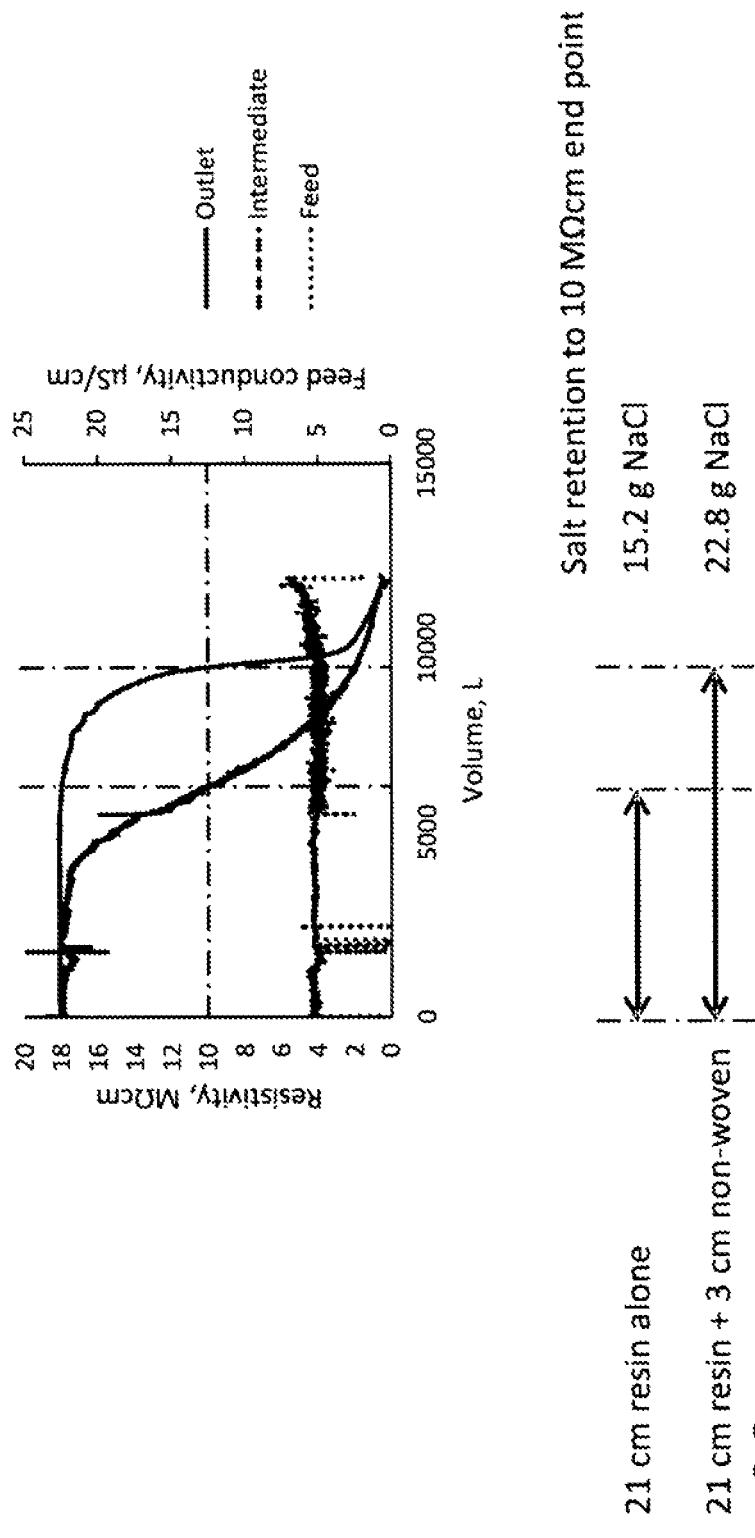
Fig. 6.2

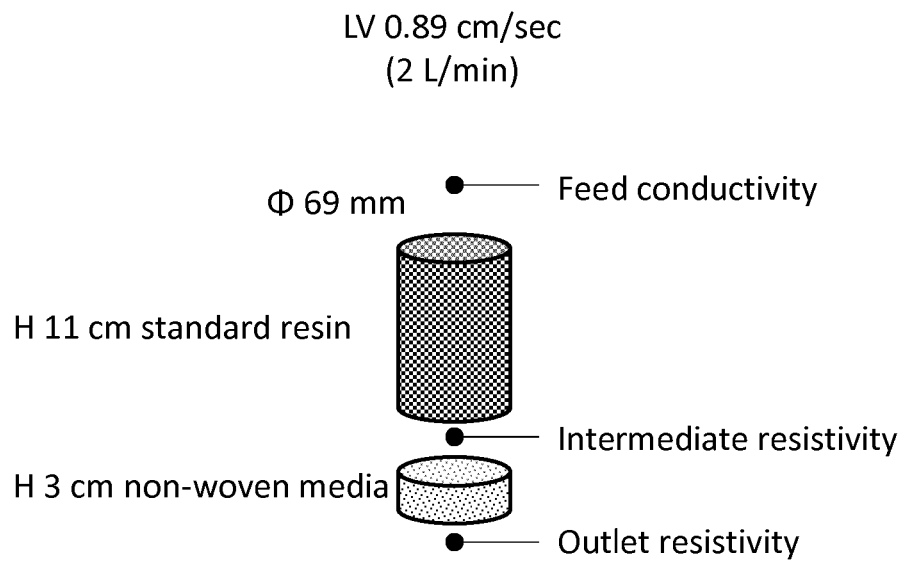
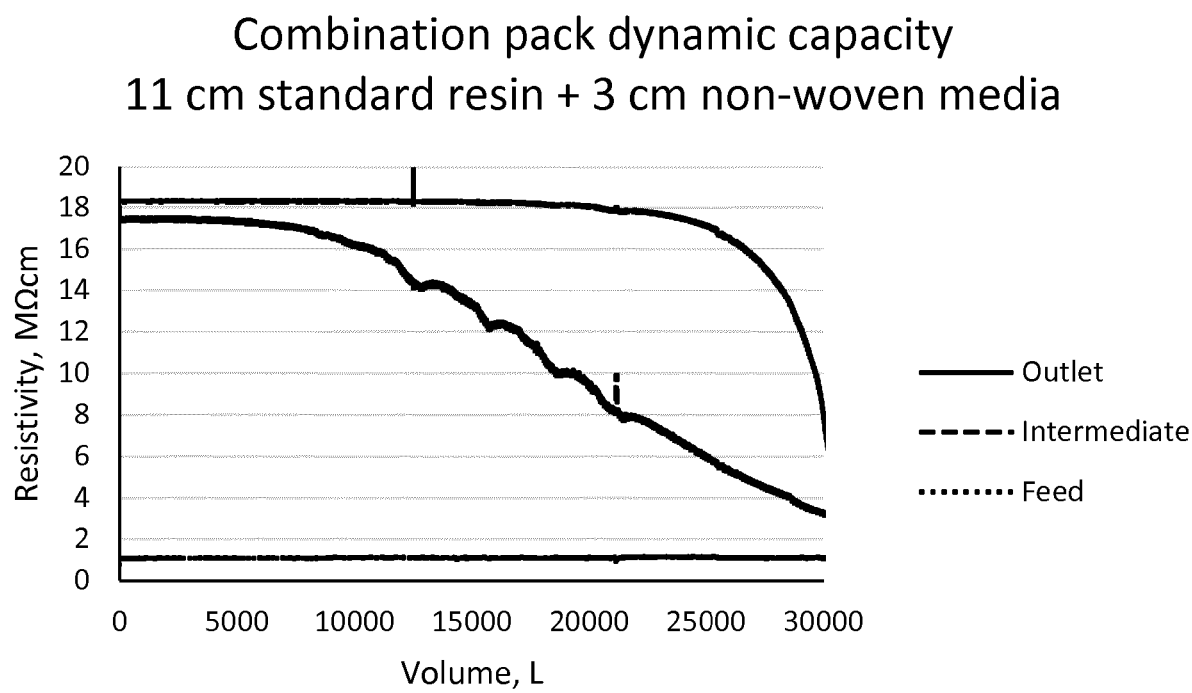
Fig. 7A

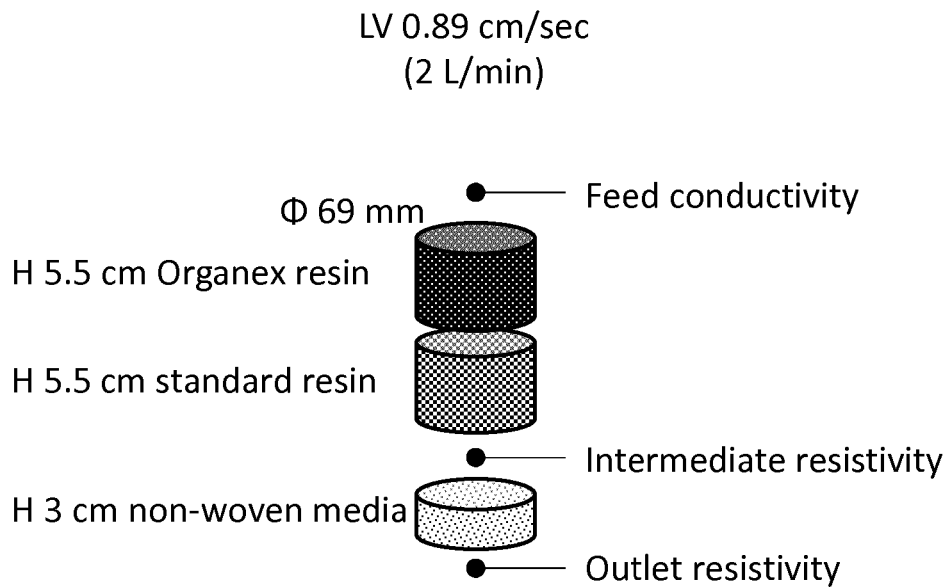
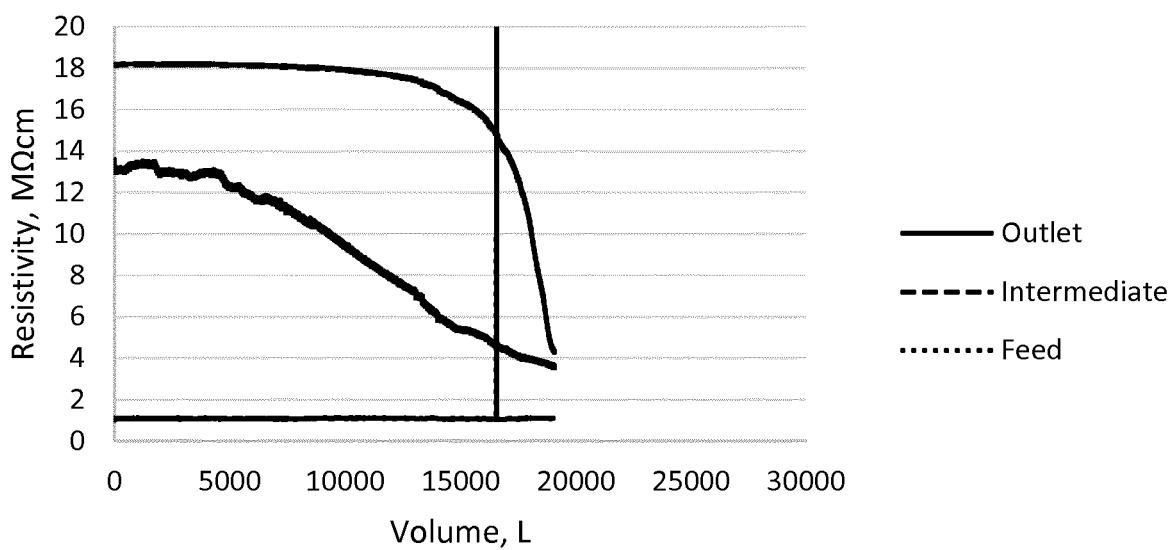
Fig. 7B

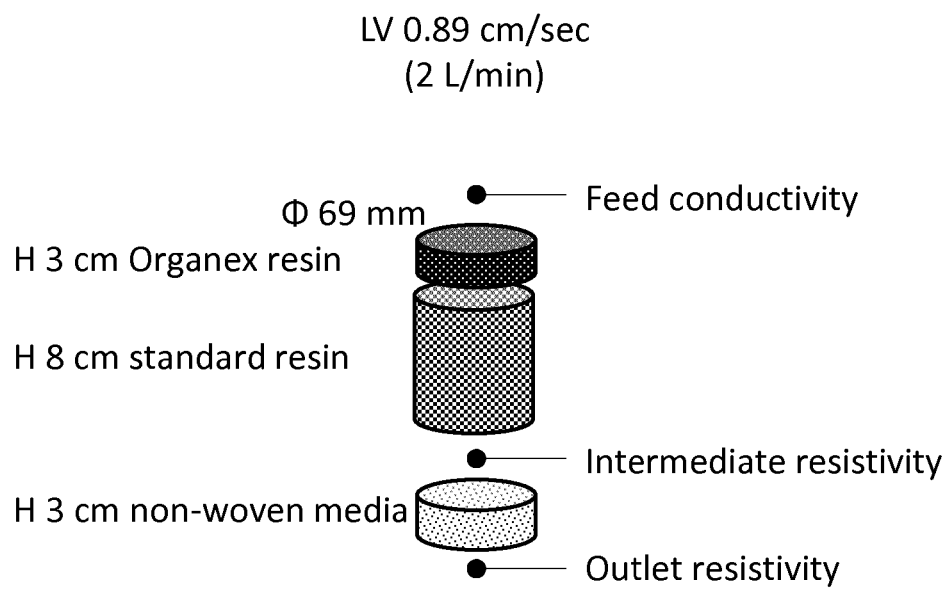
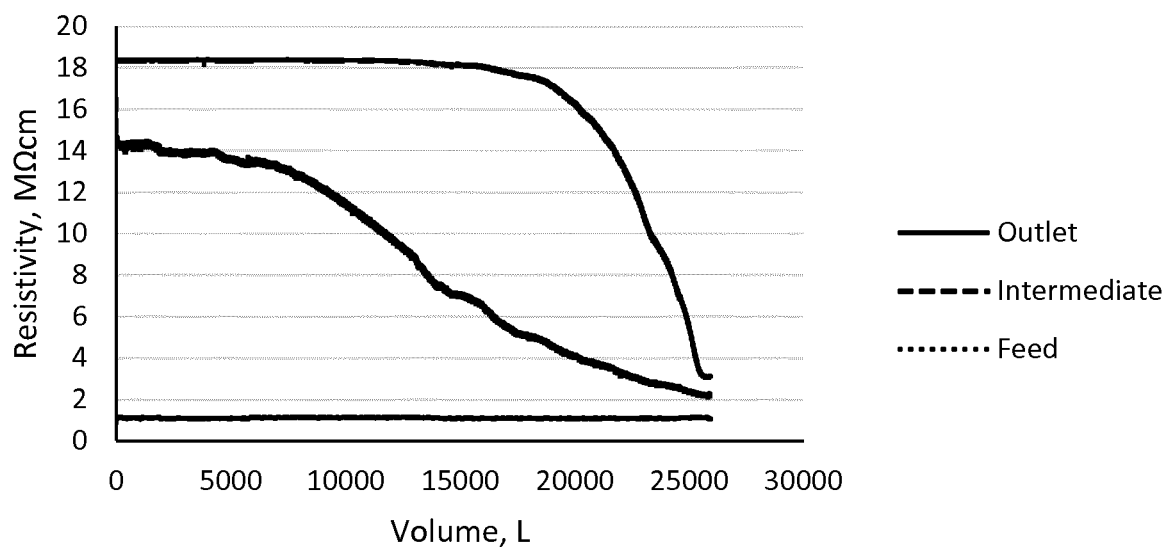
Fig. 7C

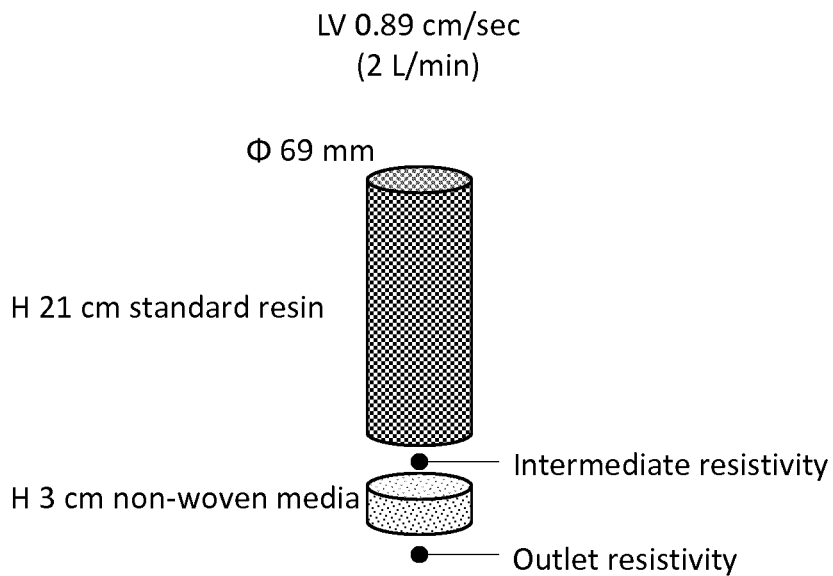
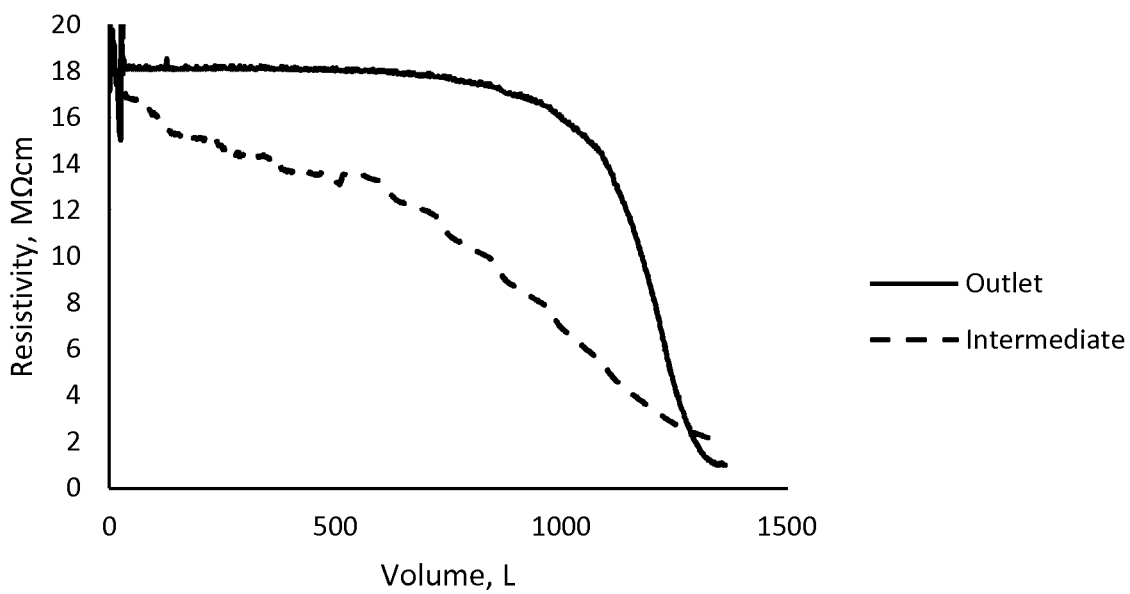
Fig. 8.1

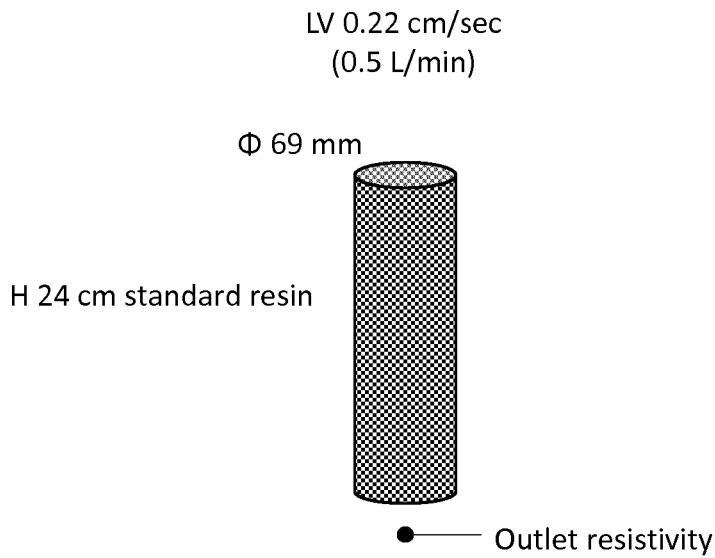
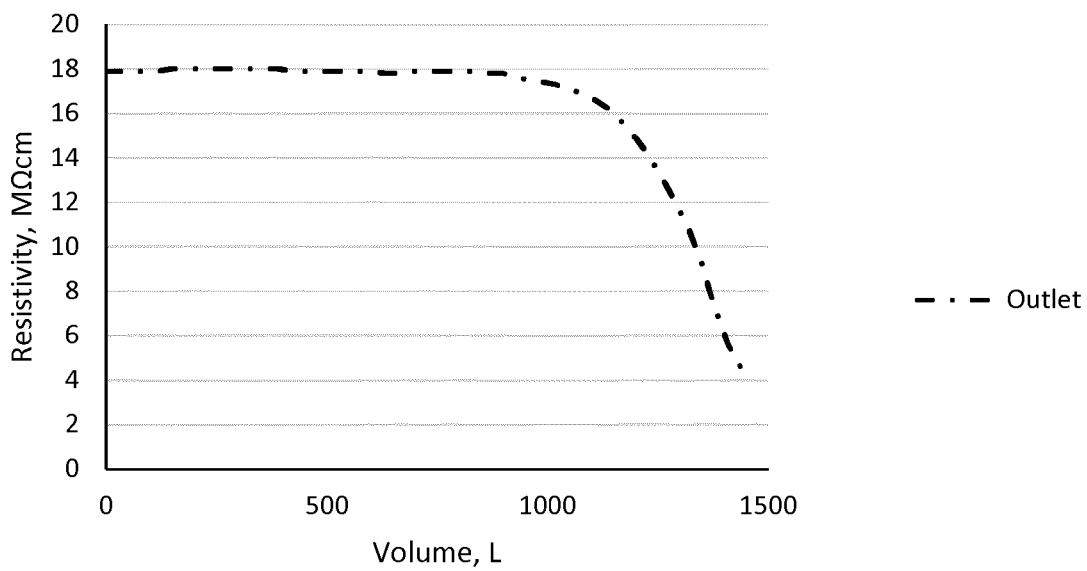
Fig. 8.2

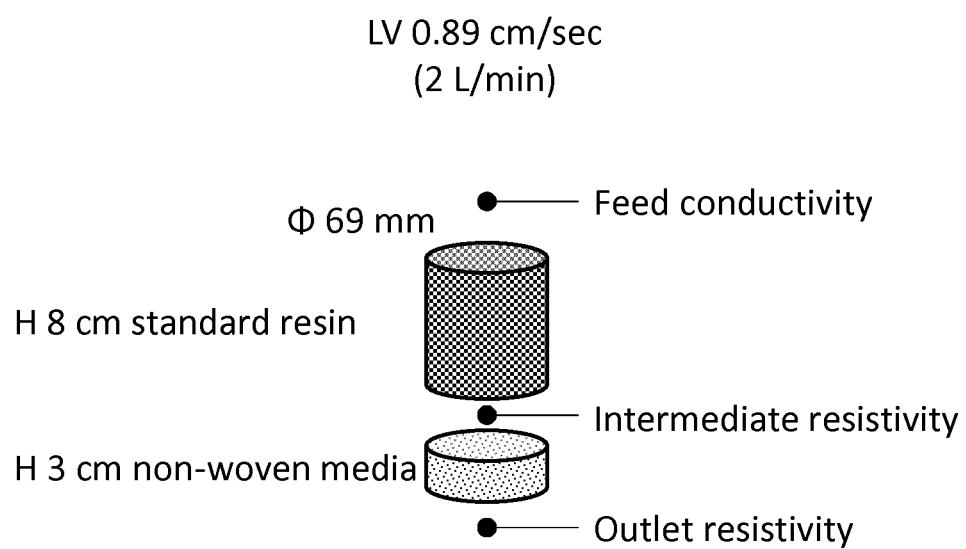
Fig. 9.1

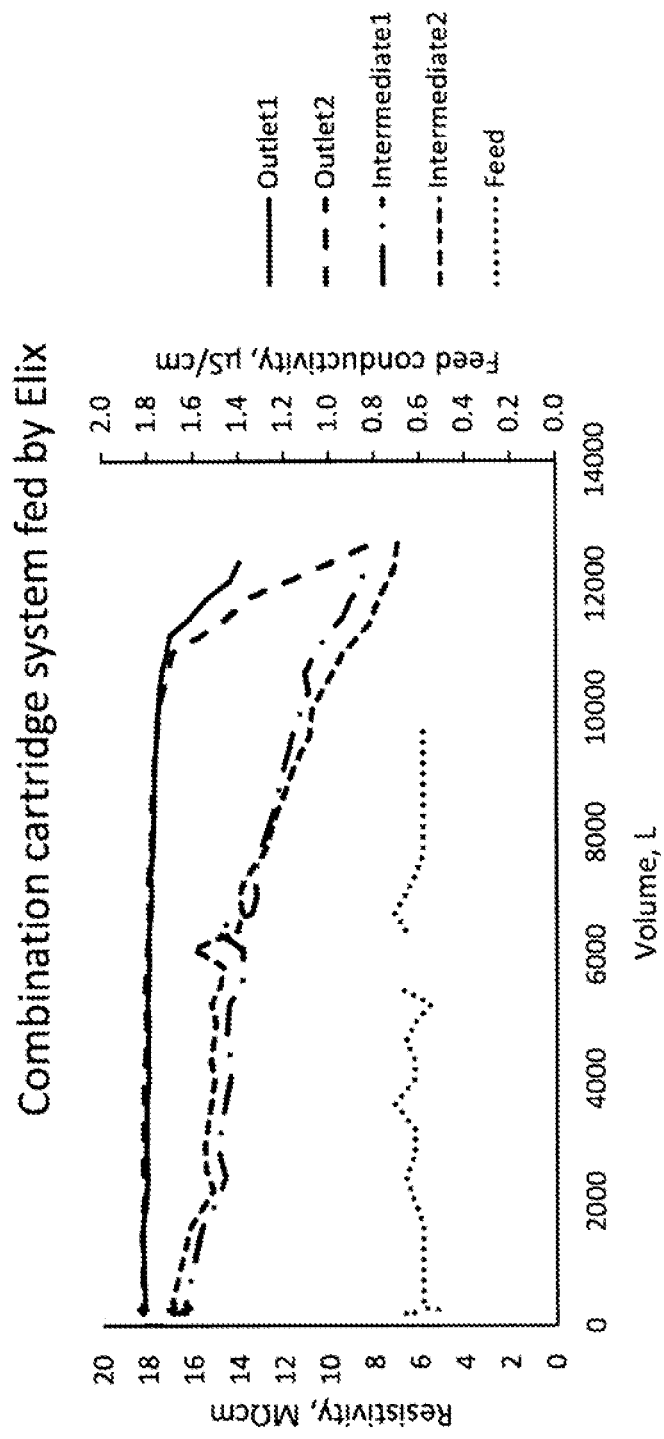
Fig. 9.2

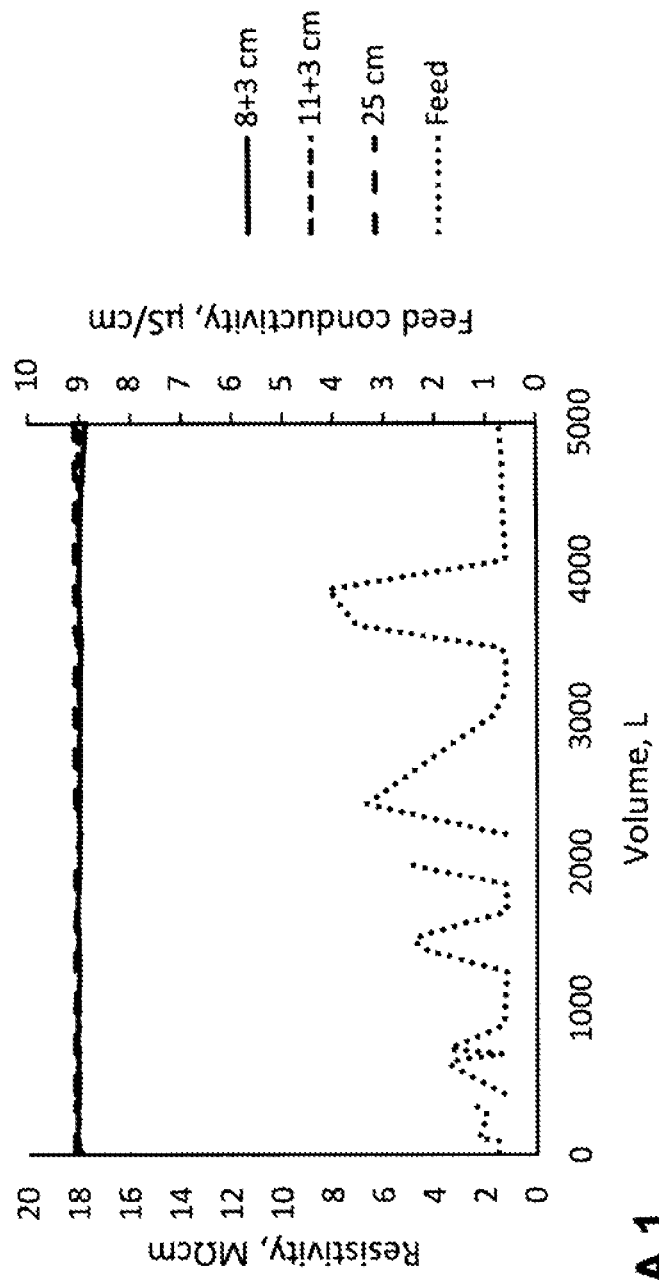
Fig. 11A.1

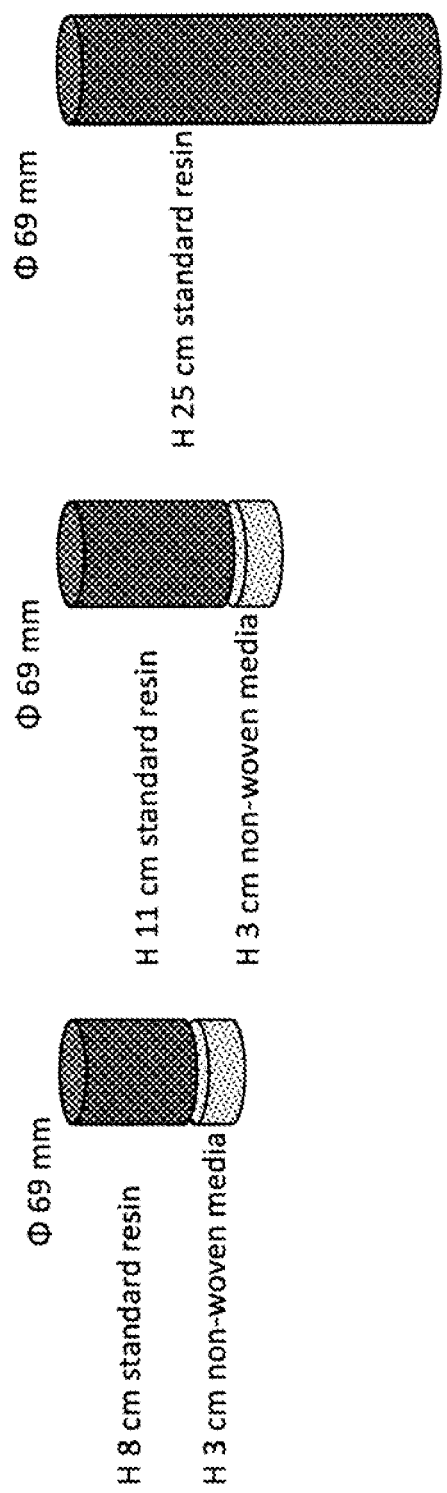
Fig. 11A.2

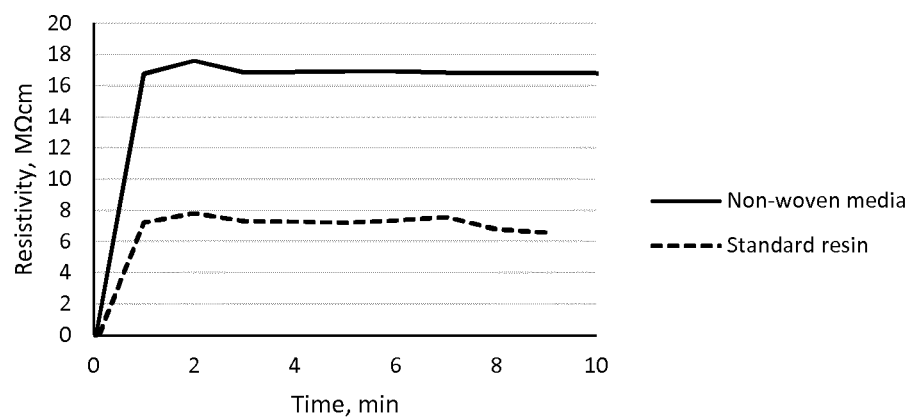
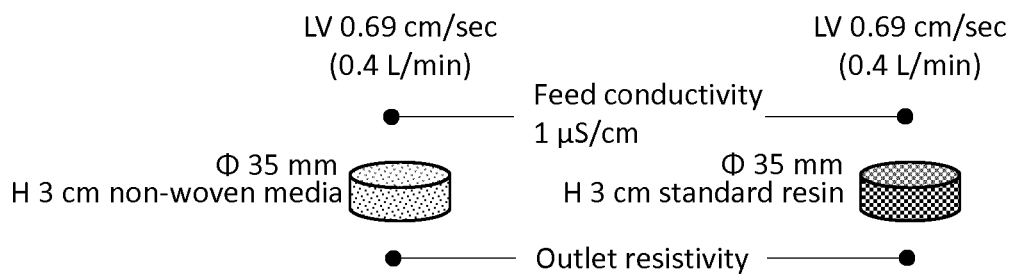
Fig. 12

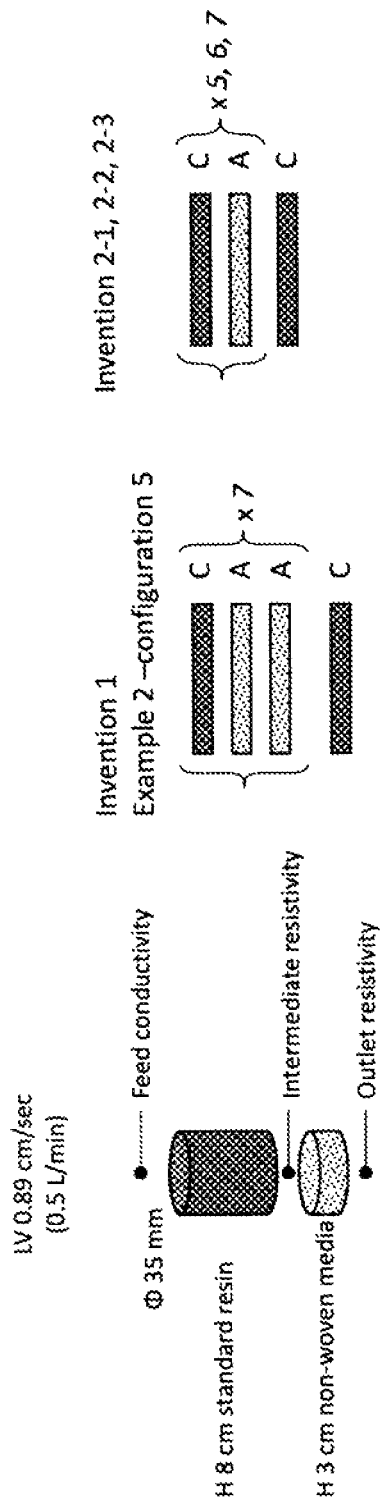
Fig. 13.1

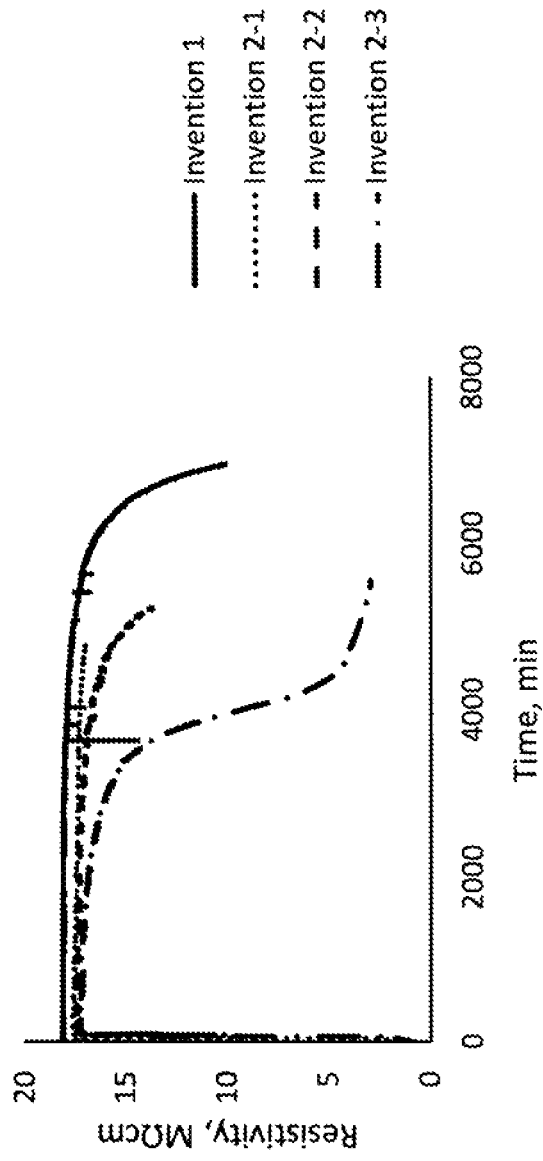
Fig. 13.2

METHOD FOR PRODUCING ULTRAPURE WATER

BACKGROUND OF THE INVENTION

The present invention relates to a method for producing purified water comprising a step (a) of passing water through a mixed bed ion exchanger comprising beads having a diameter between 0.2 and 0.7 mm and a step (b) of passing water through a fibrous ion-exchange material. The invention further relates to a module comprising the mixed bed ion exchange resin and the fibrous material and to a water treatment system for producing ultrapure water comprising the mixed bed ion exchange resin and the fibrous material.

Laboratory ultrapure water is prepared from municipal water through a combination of several technologies. Typically, activated carbon, reverse osmosis, ion exchange resins, micro/ultrafiltration, ultraviolet irradiation and sterile grade microfiltration are used alone or in combination for purifying water. Ultrapure water polishing is the last step of water purification. Milli-Q® (a commercial product from Merck KGaA, Darmstadt, Germany) employs ion exchange resins, activated carbon, a photooxidation UV lamp, microfiltration and/or ultrafiltration.

Ultrapure water (or Type 1 water) is typically characterized by a resistivity of greater than 18 MΩ·cm (at 25° C.) and a value of total organic compound (TOC) of less than 20 parts per billion (ppb). Type 2 water is typically characterized by a resistivity of greater than 1.0 MΩ·cm and a TOC value of less than 50 ppb. Type 3 water is the lowest laboratory water grade, recommended for glassware rinsing or heating baths, for example, or to feed Type 1 lab water systems. It is characterized by a resistivity of greater than 0.05 MΩ·cm and a TOC value of less than 200 ppb.

In the state of the art the final polishing step in ultrapure water production is accomplished by using ion exchange media allowing for the removal of anions and cations.

Ion exchange resins are known and proven for the elimination of ionic impurities from water in pure and ultrapure water production. Typically, these are spherically polymerized styrene beads with 0 to 16% of divinylbenzene cross linking, functionalized by sulfonation for cation exchange and amination for anion exchange and regenerated by strong acid and strong basic solutions, respectively, or other techniques such as electrochemical regeneration. Within this regard, the term "resins" refers to mixed media of both anion and cation exchange resins at adequate mixing proportion resulting in equal capacity for both types of ions or asymmetric capacity for specific water applications. Resins to be used for pure and ultrapure water production require a high regeneration degree, such as 95 to 99%, or even higher. This means that this percentage of ion exchange sites is regenerated to H form for cation exchange and to OH form for anion exchange. For ultrapure water polishing a high resin purity is required, i.e. with a very low content of contaminants, as well as an extremely low leaching of total organic carbon. For this reason resins are typically further purified.

Water deionization for pure and ultrapure water production in science and industry is typically done by ion exchange resin beads. The dimension of the deionization cartridges depends on the expected flow rate, the volume to be treated and the quality of produced water. For example, a disposable cartridge for a small laboratory water system may contain 1 to 3 L of resin, whereas a resin bottle for large industrial scale typically contains 5 to 20 L of resin.

Today, granular bead type resins are the only media available in industry and market. All granular media comprise particles of around 600 to 700 µm in diameter, being the standard size in industrial use of ion exchange water deionization. Typically, when RO pretreated municipal water (5-25 µS/cm conductivity) is used to feed an ultrapure water system, the cartridge column height should be 700 to 1000 mm for achieving a water quality exhibiting a resistivity of 18.2 MΩ·cm. In order to allow for an adequate contact time to eliminate ions in a one pass treatment the diameter of the cartridge is determined. For example, the earlier Milli-Q® system (Millipore) with 4 bowls has an inner cartridge diameter of 69 mm and a total resin height of 900 mm, reflecting the minimum necessary resin height for achieving ultrapure water quality. Reduction of cartridge height may result in a decrease in water quality (i.e. ultrapure grade cannot be reached) or in a decrease of cartridge lifetime.

In the lifetime of an ion exchange cartridge for water deionization, three zones can be defined, as illustrated in FIG. 1. The minimum resin height is called the "ion exchange zone", which is responsible for achieving the expected water quality. The height is variable as a function of feed water quality, velocity and target effluent quality. A water treatment cartridge with only this ion exchange zone performs enough to achieve water quality, but with zero capacity. When water treatment is continued this zone advances forward because of resin saturation. The height of the zone depends on resin kinetics: A faster kinetic resin has a shorter zone, a slower kinetic resin a longer zone. The zone upstream of this exchange zone is called "capacity zone". The longer this zone the higher is the obtainable capacity. This means that in the state of the art the size of the cartridge can only be reduced by reducing the capacity zone, reducing the capacity of the cartridge; whereas the ion exchange zone cannot be shortened without losing water quality. The only way of reducing this zone is by improving the kinetics of the resin. The last zone downstream of the ion exchange zone is called "trace removal zone", which is used especially for cartridges used in ultrapure water systems.

There has been a continuous attempt to improve the kinetics of such standard ion exchange media in order to provide better performing polishing solutions.

The earliest attempt to use fibrous ion exchange material in water filtration was published in 1965 (GB 1123908 A). This document describes the use of fibrous ion exchange material in suspension or as precoated filter, eventually post resin DI treatment to eliminate trace ions.

JP 50083267 A discloses the combination of ion exchange resin and ion exchange fiber. High kinetic fibrous ion exchanger was progressively mixed into an ion exchange resin bed, whereas more fibers were present at the DI outlet side. Such arrangement increased the ion exchange resin capacity.

EP 0195819 B1 discloses a method for ion-exchange wherein fibrous material is used in combination or mixed with resins. JP 1648665 describes an ultrapure water production system using such ion exchange method.

Other publications describe the use of fibrous media in water treatment alone, i.e. not in combination with other resins. JP 2003-251118 A discloses a fibrous ion exchanger as final filtration device to eliminate particles as well as ultra-trace metal ions from water.

The above cited documents have in common that the fibrous ion exchange material described was short microfibers of a few millimeters length. Due to its small diameter it exhibits a highly developed ion exchange surface. However, the disadvantage of such material is that it can generate a high pressure drop in column operation and that it can be difficult to handle. Within this regard, pieces of fiber with micrometer diameter or millimeter length could leak from the column.

Because of these disadvantages fibrous ion exchange material was not successfully used for water deionization or pure/ultrapure water production, despite their advantageous faster kinetics.

Recent radiation grafting techniques allowed for the insertion of ion exchange functional groups on inert and mechanically strong substrates, such as polyethylene and polypropylene. Such fibers maintain their initial properties and can have various different forms, such as threads, textiles and fabrics. Furthermore, such ion exchange materials exhibit a kinetic advantage, similar to highly surface developed powder resins (Jyo et al. 2004, Ind. Eng. Chem. Res. 43, 1599-1607). However, at the same time, the use of such fibrous ion exchange media is very limited, because its ionic capacity is almost 10 times less compared to a similar volume of standard ion exchange resin.

SUMMARY OF THE INVENTION

The object of the present invention was therefore the improvement of the kinetics in water polishing solutions, without generating the above-mentioned disadvantages.

Surprisingly it was found that the combination of standard ion exchange media with fibrous ion-exchange material results in a very good performance in water treatment improving at the same time the capacity of the media and the compactness of the consumable.

BRIEF DESCRIPTION OF THE DRAWINGS

FIGS. 5.1 and 5.2 show the configuration and dynamic capacity test for configuration 5 according to Example 3;

FIGS. 6.1 and 6.2 show the configuration and dynamic capacity test for configuration 7 according to Example 4;

FIG. 7 stows the dynamic capacity test for extended configuration 5 according to Example 5, using 11 cm of standard resin (FIG. 7A), 5.5 cm of standard resin and 5.5 cm of Organex resin (FIG. 7B), and 3 cm of Organex resin and 8 cm of standard resin. (FIG. 7C).

FIGS. 8.1 and 8.2 show the configurations and dynamic capacity at different flow rates according to Example 6;

FIGS. 9.1 and 9.2 show the configuration and resistivity of combination cartridges determined for a full scale model on a Milli -Q® system according to Example 7;

FIG. 12 is a comparison of the resistivity of standard resin and fibrous material over time using feed water containing weak acids according to Example 9; and FIG. 13 shows the configuration (FIG. 13.1) and dynamic capacity test (FIG. 13.2) for different media according to Example 10.

DETAILED DESCRIPTION

Figure 1:
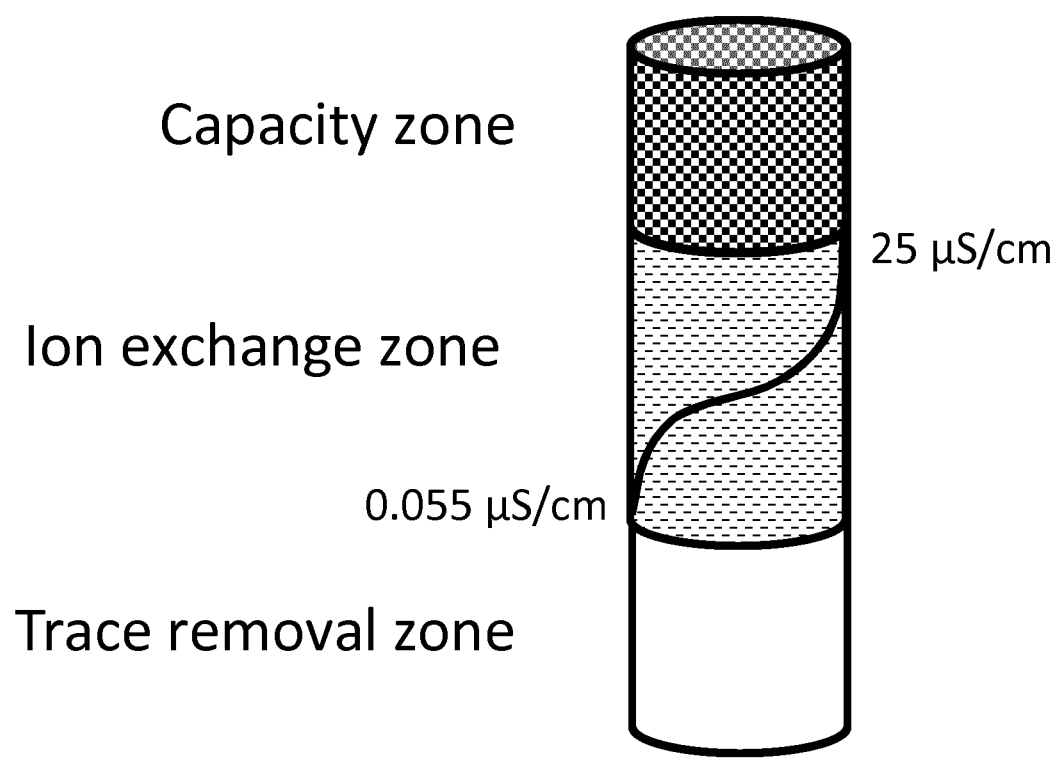
FIG. 1. illustrates three zones of an ion exchange cartridge.

In a first embodiment, the present invention therefore relates to a method for producing purified water comprising a step (a) of passing water through a mixed bed ion exchanger comprising beads having a diameter between 0.2 and 0.7 mm and a step (b) of passing water through a fibrous ion-exchange material.

According to the present invention, the term purified water refers to water of Type 1, Type 2 or Type 3, or DI (deionized) water, as defined above. In a preferred embodiment the purified water is ultrapure water, i.e. Type 1 water, characterized by a resistivity of greater than 18 MΩ·cm (at 25° C.) and a value of total organic compound (TOC) of less than 20 parts per billion (ppb).

In the method of the present invention step (a) and step (b) can be performed in any order, i.e. step (a) can be performed before step (b) or step (b) can be performed before step (a). In a preferred embodiment step (a) is performed before step (b). In this case, the water is first passed through the mixed bed ion exchanger comprising beads having a diameter between 0.2 and 0.7 mm and later through the fibrous ion-exchange material.

The ion exchanger of step (a) is an insoluble matrix typically in the form of beads, fabricated from an organic polymer substrate (ion-exchange resin). According to the present invention, a gel-type ion exchanger is used, which comprises a mixture of anion exchange particles and cation exchange particles in the form of beads, respectively ("mixed bed"). The beads are typically porous, providing a high surface area.

Typically, an anion exchange particle is capable of exchanging hydroxide anions with anions in solution. The cation exchange particles are capable of exchanging hydrogen ions with cations in solution. The mixture of anion exchange particles and cation exchange particles can also include particles of activated carbon which adsorb any nonionic species which may be present in the water. In a preferred embodiment the mixed bed ion exchanger consists of a mixture of anion exchange particles and cation exchange particles.

The diameter of the beads of the mixed bed ion exchanger is between 0.2 and 0.7 mm, preferably between 0.5 and 0.7 mm. This resin is also referred to as "standard resin" or "standard ion exchanger".

These diameters represent the diameter of the beads in their regenerated state. The given diameter represents the mean particle diameter. Preferably, the anion exchange beads and the cation exchange beads are monodisperse, respectively. The size of the beads can be determined by microscopic imaging technique instrumentation such as Camsizer (Horiba Camsizer XL), Nikon SMZ-2T microscope or Olympus BX41 microscope with DP71 digital CCD camera and Cell imaging software.

All ion exchange materials known to a person skilled in the art can be used in the present invention. Typically, ion exchange resins are based on copolymers of styrene and divinylbenzene. The copolymerization of styrene and divinylbenzene results in crosslinked polymers, having a crosslink degree of 0 to 16%. The ion exchanging sites are then introduced after polymerization. For example, sulfonating allows the production of cation exchange resins with sulfonic acid groups and chloromethylation followed by amination leads to the introduction of quaternary amino functions for the production of anion exchange resins. The manufacturing processes of ion exchange resins are well-established and a person skilled in the art is familiar with suitable steps, reagents and conditions.

In a preferred embodiment the mixed bed ion exchanger is based on styrene divinylbenzene co-polymer. More preferably, the mixed bed ion exchanger is based on sulfonated styrene divinylbenzene copolymer (cation exchange) and styrene divinylbenzene copolymer modified with quaternary amino groups (anion exchange).

Typical capacities of the anion exchange resin may be for example 1 eq/L and for the cation exchange resin 2 eq/L. These numbers are however not limiting.

Typically, mixed bed ion exchangers comprise a mixture of anion and cation exchangers in a ratio so that they have equal capacities for both types of ions, i.e. the cation exchanger and the anion exchanger are mixed in a 1/1 isocapacity ratio.

Commercially available ion exchange resins with beads of between 0.2 and 0.7 mm diameter suitable according to the present invention, are, for example:

TABLE 1

| Manufacturer | Reference | Bead diameter | Capacity |
|---|---|---|---|
| Dow/Rohm and Haas | Amberjet UP 6150 | Average 0.63 mm | Cation: 1.8 eq/L Anion: 1.0 eq/L |
| | Amberjet UP6040 | Average 0.64 mm | Cation: 2.0 eq/L Anion: 1.1 eq/L |
| | MR450UPW | Cation 0.36 mm Anion 0.59 mm | Cation: 1.9 eq/L Anion: 1.0 eq/L |
| Lanxess | Lewatit UP 1292 MD | Average 0.62 mm | Cation: 2.2 eq/L Anion: 1.1 eq/L |
| | Lewatit UP 1294 MD | Average 0.63 mm | Cation: 2.0 eq/L Anion: 1.1 eq/L |
| Mitsubishi | Diaion SMT 100L | >0.4 mm 90% Polydisperse >1.18 mm 5% <0.3 mm 1% | Cation: 1.7 eq/L Anion: 0.9 eq/L |
| | Diaion SMT 200L | Polydisperse >1.18 mm 5% <0.3 mm 1% | Cation: 1.7 eq/L Anion: 0.9 eq/L |

Non-regenerated resins or resins which are not treated for ultrapure water production have to be regenerated and purified before use according to the present invention. A person skilled in the art is well aware of the necessary steps. For example, the following procedure can be used:

A preparation column is filled with resin and rinsed by a continuous flow of ultrapure water with 18.2 MΩ·cm and <5 ppb TOC at >60 BV/h (BV=bed volume) for >15 min. 2N HCl (for cation exchanger) or 2N NaOH (for anion exchanger) are passed at 4 BV/h for 1 hour. The column is rinsed by a continuous flow of ultrapure water with 18.2 MΩ·cm and <5 ppb TOC at >60 BV/h for >15 min.

The ion-exchange material used in step (b) of the present invention is a fibrous material.

According to the present invention any type of fibrous ion-exchange material can be used. The fibres can be short or long fibres. The use of longer ion exchange fibres with good mechanical properties allows them to be transformed into woven, knitted of non-woven textiles in variable density and thinkness. In case of non-woven format, glue binding, thermal bonding or mechanical needle punching are applicable to fix the fibers to a solid textile. Depending on the ion exchange fiber manufacturing technologies, such mechanical transformation is done before or after fiber fuctionalization.

According to the present invention the fibrous ion-exchange material is preferably a non-woven fibrous exchange material.

The introduction of ion exchange groups (functionalization) can be done by various techniques:

Short ion exchange fibers can be produced by the composite fiber technique. The substrate fiber polymer itself does not possess ion exchange properties but the fiber is spun from melt polmyer or polymerization from monomer mixed with ion exchange resin particles. Alternatively, an ion-exchange fiber can be produced by copolymerization of ion exchangeable monomers and non ion exchangeable monomers to fiber spinning.

A further option is to chemically convert polymeric fibers such as polyacrylonitrile and polyvinylalcohol to ion exchange fibers by amination and sulfonation, as for example described inKosandrovich and Soldatov 2012, Ion Exchange Technology I: Theory and materials, Chapter 9. Finally, the graft copolymer technique allows to build side chains of different polymers on the main fiber substrate polymer chain, which can then be transformed to ion exchangers by fuctional group insertion such as sulfonation for cation exchanger and methylamination for anion exchanger. Technically known side chain monomer-copolymers are for example styrene, styrene-divinylbenzene copolymer, glycydylmethacrylate and methylmethacrylate. However, this technique is so versatile that it is also applicable to various substrate polymers such as PE, PP, PVDF, PET, as well as to different forms of fibers, bobbins, textiles and films. Graft copolymerization is typically initiated with free radical generation triggered by heat, chemicals, UV or ionization radiation (Nasef and GOven 2012, Progress in Polymer Science 37, 1597-1656).

In a preferred embodiment, it the fibrousion-exchange material comprises a substrate into which ion-exchange groups have been introduced by radiation-induced graft polymerization. Such material is typically based on a substrate made of polymeric fiber. The substrate may consist of monofilaments of a single type of fiber, or alternatively of a composite fiber having a core-sheath structure in which the core and the sheath are made of different polymers. In a preferred embodiment the polymer is a polyolefinic polymer, such as polyethylene or polypropylene. In a more preferred embodiment the polymer is polypropylene.

The ion-exchanging groups are introduced by radiation-induced graft polymerization. Radiation-induced graft polymerization is a technique by which a polymeric substrate is exposed to radiation to form radicals, which are reacted with a monomer so that it is introduced into the substrate. Radiation induced graft polymerization is a technique well-known to a person skilled in the art.

The ion-exchange groups to be introduced into the substrate are not limited and various cation- and anion-exchange groups may be employed. For example, cation exchangers may contain cation-exchange groups such as sulfonic groups, carboxyl groups, phosphoric groups or phenolic hydroxyl groups. In a preferred embodiment the cation-exchanger comprises sulfonic groups. Examples for anion-exchange groups for anion exchangers are primary, secondary or tertiary amino groups or quaternary ammonium groups. In a preferred embodiment the anion-exchanger comprises quaternary ammonium groups.

Such ion exchange groups are typically introduced by grafting polymerizable monomers to the substrate, which either have ion exchange groups or groups which can be converted to ion exchange groups. Monomers having ion-exchange groups may be, for example, acrylic acid, methacrylic acid, sodium styrenesulfonate, sodium methallylsulfonate, sodium allylsulfonate or vinylbenzyltrimethyl ammonium chloride. Monomers having groups that can be converted to ion-exchange groups are, for example, acrylonitrile, acrolein, vinylpyridine, styrene, chloromethylstyrene or glycidyl methacrylate. When using such groups, they are first introduced into the substrate by radiation-induced graft polymerization, then reacted with a modifying agent (e.g. a sulfonating agent such as sodium sulfite or an aminating agent such as diethanolamine) to generate ion-exchange sites.

Commercially available fibrous ion-exchange material suitable to be used in step (b) of the present invention are available from several manufacturers. Examples are listed in the following table:

TABLE 2

| Manufacturer | Fibers trade name | Form |
| --- | --- | --- |
| IFOCH | FIBAN | Staple fiber, nonwoven sheets, graft fiber |
| IMT-Filter Ltd | PANION | Staple fiber: cut length 30-70 mm |
| Imatek&K, Ltd | MION | Staple fiber; short staple fiber |
| LTD LIRSOT | VION | Nonwoven sheets 2.5, 5, 8 mm; copolymer fiber |
| Nichivy | IEF (Ion Exchange Fiber) | Nonwoven sheets; cut fibers, paper; converted fiber |
| Toray Fine Chemicals Co., Ltd | IONEX/RX-1 | Paper, short fiber; composite fiber |
| Ebara | A-IEN/C-IEN | Nonwoven fabric; graft fiber |
| Johnson Matthey (Smopex) | SMOPEX | Fibers (staple fiber) |
| Kurabo | Kurangraft | Nonwoven fabric; graft fiber |

The commercially available fibrous ion-exchange materials listed in the table above do not have the use for final polishing in ultrapure water production as original purpose. Therefore, these materials might not be regenerated at all or enough. If this is the case the materials have a risk to release specific ions or organic impurities. Regeneration and purification of media is important to achive the best ultrapure water quality in this invention.

Similarly to non-regenerated resins, fibrous ion-exchange materials are prepared similarly by a continuous flow packed column containing separated anion exchangers or cation exchangers, in the form of discs for final column packing, bulk fibers (optionally in bobbin), or scroll of media sheets. Materials are regenerated in a batch reactor with excess acid or base.

According to the present invention the fibrous ion-exchange material is arranged in layers. Within this regard, the ion-exchange material sheets may comprise cation exchange groups as well as anion exchange groups. However, in a preferred embodiment, the ion-exchange material sheets comprise either cation or anion exchange groups. In a preferred embodiment, the fibrous ion-exchange material comprises layers of fibrous cation-exchange material comprising a substrate into which cation-exchange groups have been introduced by radiation-induced graft polymerization and layers of fibrous anion-exchange material comprising a substrate into which anion-exchange groups have been introduced by radiation-induced graft polymerization.

The sheets of fibrous ion-exchange material comprising cation-exchange groups (C) and the sheets of fibrous ion-exchange material comprising anion-exchange groups (A) may be arranged in blocks (i.e. several sheets with cation-exchange groups followed by several sheets with anion-exchange groups, or vice versa) or in various alternating forms (i.e. alternating of sheets with cation-exchange groups and anion-exchange groups, wherein within the alternation blocks of several identical sheets are possible). For example, the arrangement may be as follows:

3C+6A
10C+18A
4×(C+3A)
7×(C+2A)+C
9×(C+2A)+C
9×(C+3A)+C
13×(C+2A)+C

Preferably, the arrangement is 7×(C+2A)+C, 9×(C+2A)+C, 9×(C+3A)+C or 13×(C+2A)+C, more preferably it is 7×(C+2A)+C.

Each layer typically has a thickness of 1 mm up to 5 mm. These numbers are however not limiting.

The ratio and quantity of ion exchange resin and fibrous ion exchange media according to the present invention is as follows:

The quantity of ion-exchanger comprising beads is selected within the recommended linear velocity for optimal deionization as given by the resin supplier. However, the height can be chosen much shorter than recommended. Trace ions actively leaked by the resin bed can be eliminated by the downstream fibrous ion exchange material. The quantity of fibrous ion exchange material is selected based on the adequate media depth requirements in order to completely adsorb ions leaked from the upper resin layer. The dynamic capacity should be close to the total ion leak from the resin during the lifetime of the combination cartridge.

The diameter and height of the resin bed are determined by the target flow rate of ultrapure water production. For example, typical ion mixed bed ion exchange resin is operated optimally at 0.89 cm/sec linear velocity, i.e. a 69 mm diameter column is suitable to treat water at a flow rate of 2 L/min. A typical resin gives water of around 10-15 MΩ·cm with a 8 cm bed height. The fibrous ion-exchange material has a higher ion-exchange kinetic, e.g. 3 times faster for a typical material. In such case, the fibrous ion-exchange material only needs ⅓ of bed height in order to achieve the same ion exchange kinetic than a conventional resin bed. The expected height in use is therefore approximately ⅓.

The determined parameters can be further adjusted, if necessary: The simple application of the kinetic ratio may cause a lack in capacity. The role of the media is to completely adsorb ionic load from the leaking resin. The best design is achieved when leaking ions are eliminated and lifetime ends when the resin is saturated, i.e. when both the resin and the fibrous media are simultaneously saturated under controlled ionic leak from the resin compartment. Therefore, in order to ensure the ability of achieving ultrapure water quality of 18.2 MΩ·cm, the fibrous material capacity can be oversized by a factor 2 to 5.

The combination of standard resin with fibrous material according to the present invention results in several advantages:

The addition of fibrous media results in a surprising capacity increase, which is not directly linked to the additional capacity of the non-woven media, i.e. the effect is not additive. In contrast, the fibrous media allows for recovering unused residual capacity of the standard resin and thereby extending the apparent resin capacity. This is also due to the fact that the fibrous media layer allows to adsorb critical ionic leak until maximum resin saturation.

An adequate ratio of ion-exchange resin to fibrous media therefore almost doubles the capacity of a cartridge with a simple additional layer of fibrous media, of only 3 cm, for example. The effect of the fibrous media is only useful for the recovery of non-fully-exhausted (saturated) resin, which is independent on the total capacity of the resin compartment. If, for example, the resin quantity is doubled, the capacity of the resin part will be twice higher, but the effect of the fibrous media will not increase twice.

Another advantage is that the combination of standard ion-exchange resin and fibrous material according to the present invention allows for operating the deionization cartridge at a higher flow rate than a cartridge with standard resin alone.

Furthermore, the compact stack of fibrous material inside the cartridge does not imply the risk of bed separation and it can easily absorb temporary resistivity changes due to resin separation. This makes it possible to use it in a continuous upflow column.

Typically, the ratio of the volume of the mixed bed ion exchanger to the volume of the fibrous ion-exchange material is between 10:1 and 1:5.

In a further embodiment of the present invention, the method comprises a further step (c) of passing water through an activated carbon bed.

Activated carbon is able to remove dissolved organics and chlorine. Activated carbon is made of organic material porous particulates containing a maze of small pores, resulting in a highly developed surface. Organic molecules dissolved in water may enter the pores and bind to their walls by van der Waals forces.

According to the present invention natural activated carbon or synthetic activated carbon can be used. Natural activated carbon can be produced by treating vegetal products such as ground coconut shells carbonized at high temperature, resulting in irregularly shaped grains and elevated mineral extraction. Synthetic activated carbon is produced by the controlled pyrolysis of synthetic spherical beads. Synthetic activated carbon can be made from pyrolysis of synthetic spun fiber. Preferably, synthetic activated carbon is used.

According to the present invention step (c) can be performed before step (a) and step (b), between steps (a) and (b) or within step (a) and/or step (b).

Such alternatives are illustrated by the following examples:

Water is passed through the activated carbon bed first (step (c)), then through the mixed bed ion exchanger (step (a)) and then through the fibrous ion-exchange material (step (b)).

Water is passed through the activated carbon bed first (step (c)), then through the fibrous ion-exchange material (step (b)) and then through the mixed bed ion exchanger (step (a)).

Water is passed through the mixed bed ion exchanger (step (a)), then through the activated carbon bed (step (c)), and then through the fibrous ion-exchange material (step (b)).

Water is passed through the fibrous ion-exchange material (step (b)), then through the activated carbon bed (step (c)), and then through the mixed bed ion exchanger (step (a)).

Water is passed through the mixed bed ion exchanger (step (a)), then through a first portion of the fibrous ion-exchange material (step (b)), then through the activated carbon bed (step (c)), and then through a second portion of the fibrous ion-exchange material (step (b)), i.e. step (c) is performed within step (b).

Water is passed through the mixed bed ion exchanger mixed with activated carbon (step (a) and step (c)) and then through the fibrous ion-exchange material (step (b)).

Water is passed through a first portion of the mixed bed ion exchanger mixed with activated carbon (step (a) and step (c)), then through a second portion of the mixed bed ion exchanger (step (a)) and then through the fibrous ion-exchange material (step (b)).

According to the present invention the mixed bed ion exchanger can therefore be mixed with activated carbon.

The present invention is further directed to a method as defined above, characterized in that the method comprises a further step (d) of treating water by reverse osmosis and/or a further step (e) of treating water by electrodeionization, wherein step (d) and step (e) are performed prior to steps (a) and (b).

A person skilled in the art is familiar with the steps of reverse osmosis and electrodeionization.

The step of reverse osmosis (RO) may remove many contaminants in the water, such as particles, bacteria and organics >200 Dalton molecular weight. RO is typically performed using a semi-permeable membrane, rejecting such contaminants. Hydraulic pressure is applied to the concentrated solution to counteract the osmotic pressure. The purified water can be collected downstream of the membrane.

RO membranes are typically manufactured from cellulose acetate or thin-film composites of polyamide on a polysulfone substrate.

Electrodeionization combines electrodialysis and ion exchange process, resulting in a process which effectively deionizes water, while the ion-exchange media are continuously regenerated by the electric current in the unit. Electrodeionization allows for the effective removal of dissolved inorganics, up to a resistivity of above 5 MΩ·cm at 25° C. (corresponding to a total ionic contamination level of ca. 50 ppb). According to the present invention the use of an Elix® module is preferred for electrodeionization.

Water purification systems for producing ultrapure water are known and are normally made up of peripheral components like a supporting frame, water quality monitoring resources, a pump, solenoid valves and conductivity cells and a connecting mechanism for releasably mounting one or two purification cartridges by inter-engaging complementary connectors. Since over time, the purification media get exhausted and/or the membranes get clogged replacement is needed on a timely or water consumption basis. Therefore, the media and/or membranes are typically packaged in cartridges to facilitate the correct exchange of these consumable media from the respective water purification system.

In a further embodiment the present invention therefore relates to a module comprising a mixed bed ion exchanger comprising beads having a diameter between 0.2 and 0.7 mm and a fibrous ion-exchange material. Such modules can be used in a method as described above.

Typically, a module is a replaceable cartridge comprising the respective media. The module may be in the form of a tube, for example. For establishing the contact with the water purification system the module exhibits connectors enabling for a fluid-tight connection between the ports on the cartridge and the connectors on the system. A suitable connector is for example described in WO 2016/128107 A1.

Within the module the mixed bed ion exchanger and the fibrous ion-exchange material are arranged in series. Within this regard either the mixed bed ion exchanger can be placed in the upper part of the module and the fibrous ion-exchange material in the lower part of the module, or vice versa. Optionally, a separating mesh or screen can be used in order to keep the media in place within the module.

The preferred embodiments of the mixed bed ion exchange resin and the fibrous ion-exchange material in the modules are as defined above.

The module according to the present invention may further comprise an activated carbon bed, as defined above. In such case, the activated carbon bed may be located either upstream of the mixed bed ion exchanger and the fibrous ion-exchange material or between the latter. In a further embodiment, the activated carbon is mixed with said ion exchanger.

The height of the resin and the fibrous material in the tube is determined as described above. Typically, these are determined by feed water quality to be achieved and the capacity of the cartridge.

For example, according to the standard resin specifications of UP6150 from Dow/Rohm (a typical resin as mentioned above), a minimum resin height of 900 mm is required while the service flow rate is between 30 and 40 bed volume per hour (BV/h) for deionization and ultrapure water polishing. A typical laboratory ultrapure water system is designed to dispense 2 L/min. 3-4 L resin with the required bed height and bed volume to process 2 L/min requires a column inner diameter of 65.2 mm to 75.2 mm with a linear velocity (LV) of 1 cm/sec to 0.75 cm/sec (36 m/h to 27 m/h).

The same calculation for the resin Lanxess UP1292/1294 with a given specification of the minimum bed height of 600 mm and a flow rate of 48 BV/h, results in an optimal diameter of 73 mm and a linear velocity of 0.8 cm/sec (28 m/h).

Typical laboratory ultrapure water systems such as Milli-Q respect this rule leading to a column diameter of 69 mm.

The total resin height in the cartridge is typically between 10 and 60 cm. Preferably, the total resin height is between 20 and 50 cm. In a very preferred embodiment the total resin height is between 20 and 40 cm.

Typically, the cartridges are in tube form having an inner diameter between 65 and 75 mm, preferably around 69 mm.

In a further embodiment the present invention relates to a water treatment system for producing ultrapure water comprising a mixed bed ion exchanger comprising beads having a diameter between 0.2 and 0.7 mm and a fibrous ion-exchange material.

Water treatment systems are known in the art. They typically comprise peripheral components like a supporting frame, water quality monitoring resources, pumps, solenoid valves and conductivity cells. When the mixed bed ion exchanger and the fibrous material are provided in modules a connecting mechanism for releasably mounting one or more of such modules by inter-engaging complementary connectors is also required. A connecting mechanism which can be used according to the present invention is for example described in WO 2016/128107 A1.

The present invention therefore also relates to water treatment system as defined above wherein the mixed bed ion exchanger and the fibrous ion-exchange material are provided in a single module as defined above.

In an alternative embodiment, the mixed bed ion exchanger and the fibrous ion-exchange material are provided in at least two modules. For example, the mixed bed ion exchanger may be provided in a first cartridge and the fibrous ion-exchange material in a second cartridge.

The modules may be provided individually, or molded together.

The water treatment system may further comprise an activated carbon bed, as defined above.

Again, the mixed bed ion exchanger, the fibrous ion-exchange material and the activated carbon bed may be provided in a single module, as defined above.

Alternatively, in a preferred embodiment, the activated carbon bed is provided in a further module, comprising the activated carbon bed alone or alternatively together with a mixed bed ion exchanger.

EXAMPLES

Example 1

Ion-Exchange Efficacy of Fibrous Ion-Exchange Media

In the following experiments fibrous anion exchange material and cation exchange material obtained from Ebara Clean Environment are used. These materials are based on a polypropylene microfiber non-woven substrate (fiber nominal diameter 50 µm), subjected to radiation graft polymerization for introducing a copolymer (chloromethylstyrene and glycidylmethacrylate) and functionalized to quaternary amine and sulfonate. Material being approximately 1 mm thick possesses 1.4 meq/g dry anionic or 2.7 meq/g dry cationic exchange capacity, according to ASTM D2187-2009 total capacity equivalent method.

Non-regenerated fibrous ion exchange material which are not treated for ultrapure water production have to be regenerated and purified before use according to the present invention.

Materials are first die-cut into disks with an adequate diameter of 35 mm or 69 mm. Non-regenerated cation exchangers are exposed to 2N HCl solution (prepared from 25% HCl (EMSURE, Merck KGaA)) exceeding more than 10 times the ion exchange capacity of the cation exchangers for more than 12 hours at room temperature on an orbital mixing table. The materials are then rinsed three times with Milli-Q water. Finally the ion exchanger disks are filled into the column and rinsed with Milli-Q water at 0.89 cm/sec linear velocity for 15 minutes.

For the anion exchanger, 2N NaOH (prepared from 50% NaOH (EMSURE, Merck KGaA)) is used instead of HCl.

Layered ion exchange material is put in a 35 mm diameter flow through column to test the exchange kinetics.

NaCl is added into the water in order to adjust the feed ionic conductivity. Injected salt is mixed in recirculation and salt in feed and effluent is determined using a conductivity meter to calculate the deionization efficiency.

For simulating typical feed water conditions in laboratory, NaCl (Merck EMSURE®) is spiked to a conductivity of 25 µS/cm into ultrapure water prepared by Elix® 100 system (Merck KGaA, Darmstadt, Germany), SDS 200 (Merck KGaA, Darmstadt, Germany) and Mill-Q® Reference A+ (Merck KGaA, Darmstadt, Germany).

In the test bench, ultrapure water stored in 10 L PE tank recirculates through a make-up polisher (Quantum TEX polishing cartridge, Merck KGaA, Darmstadt, Germany) and a test column containing ion exchange resin samples.

Upstream of the test tube, a salt injection point is located where a precise injection pump (ISMATEC MCP-CPF process pump+PMOCKC pump head) spikes concentrated salt solution prepared at 30 g/L to target conductivity of 25 µS/cm. Resistivity sensors (Thornton 770MAX, Mettler Toledo) mesure water resistivity at the inlet and outlet of the test column.

The diameter of the test column is 35 mm as ¼ scale model. The flow rate of water recirculation is adjusted to a linear velocity of 0.69 cm/sec, i.e. 0.4 L/min.

Figure 2:
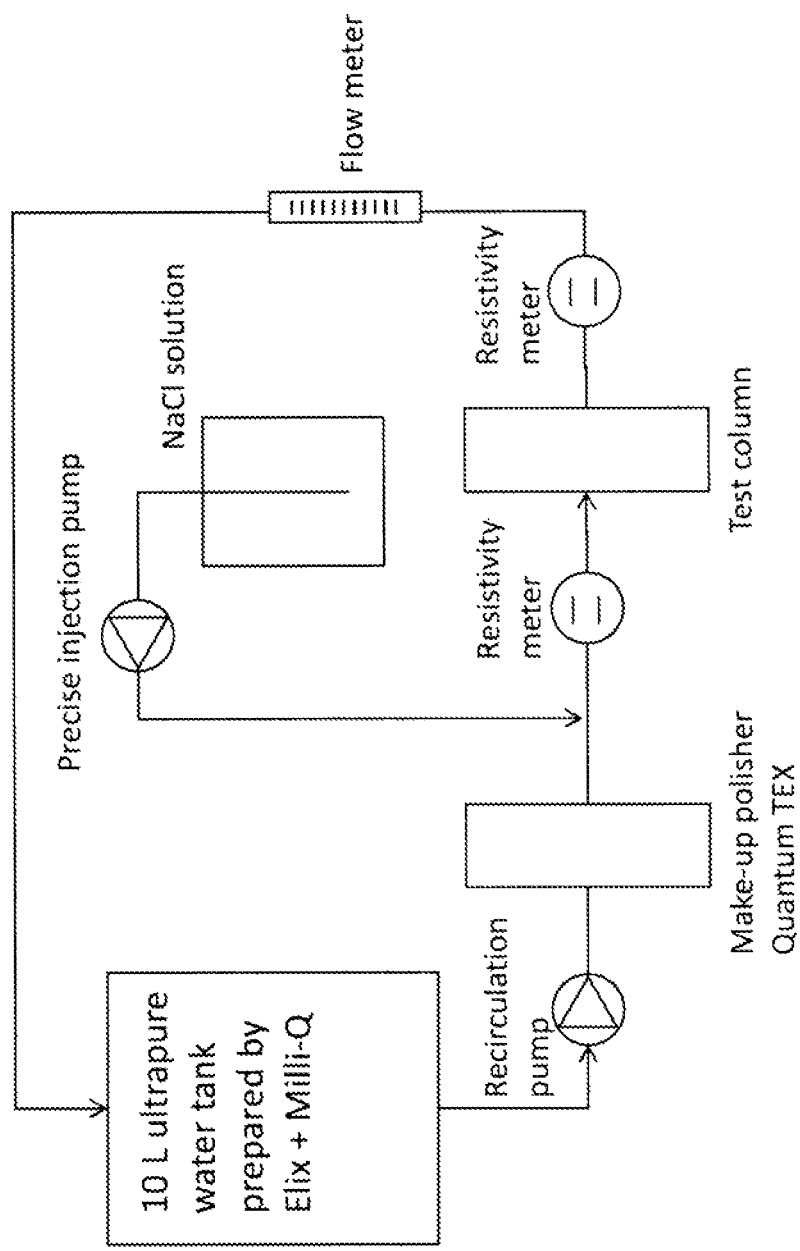
FIG. 2 illustrates the flow schematics of the experimental set-up for Example 1.

The flow schematics of this experimental set-up is shown in FIG. 2 (dynamic capacity test bench).

Figure 3:
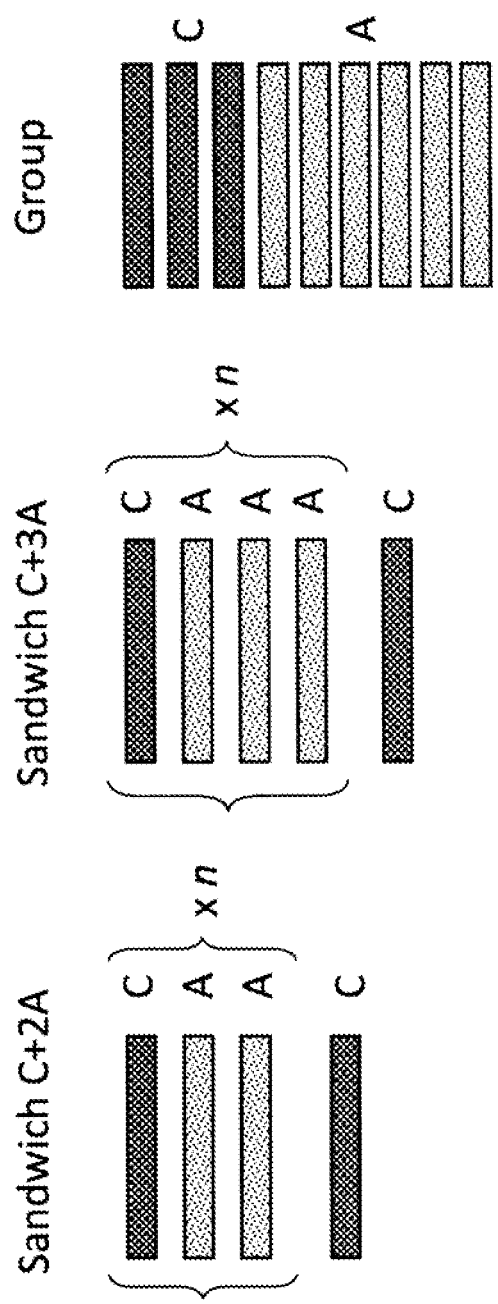
FIG. 3 illustrates configurations of cationic and anionic exchange material layers as tested in Example 1.

The following configurations (Table 3) are tested (C stands for cation exchange material; A for anion exchange material) (see also FIG. 3):

TABLE 3

| Configuration | Number of discs C | Number of discs A | H, mm | Ionic removal |
|---|---|---|---|---|
| Sandwich 4 × (C + 3A) | 4 | 12 | 21 | 54% |
| Sandwich 7 × (C + 2A) + C | 8 | 14 | 30 | 92% |
| Sandwich 9 × (C + 2A) + C | 10 | 18 | 40 | 95% |
| Sandwich 9 × (C + 3A) + C | 10 | 27 | 50 | 95% |
| Sandwich 13 × (C + 2A) + C | 14 | 26 | 55 | 99% |
| Group (3C + 6A) | 3 | 6 | 11 | 27% |
| Group (10C + 18A) | 10 | 18 | 40 | 67% |

Results:

Three configurations with different media thicknesses are evaluated. The sandwich configuration with a C/A ratio of ½ (C+2A) or ⅓ (C+3A) showed good results. The deionization efficiency is improved when the stack thickness is increased. The comparison of 9×(C+2A) and 9×(C+3A) shows that the ⅓ ratio configuration does not improve deionization despite the increased anionic capacity. In contrast, the separated media group configuration demonstrates poor results.

It should be noted that the ½ ratio is ionically equilibrated considering the media capacities (2.7 meq/g and 1.4 meq/g for cation and anion exchange media, respectively).

In a further experiment the deionization efficiency is compared between conventional mixed bed ion exchange resin (Jetpore®, used in Milli-Q consumable cartridge, Merck KGaA) and the fibrous material in the ½ ratio (C+2A) as described above.

Figure 4:
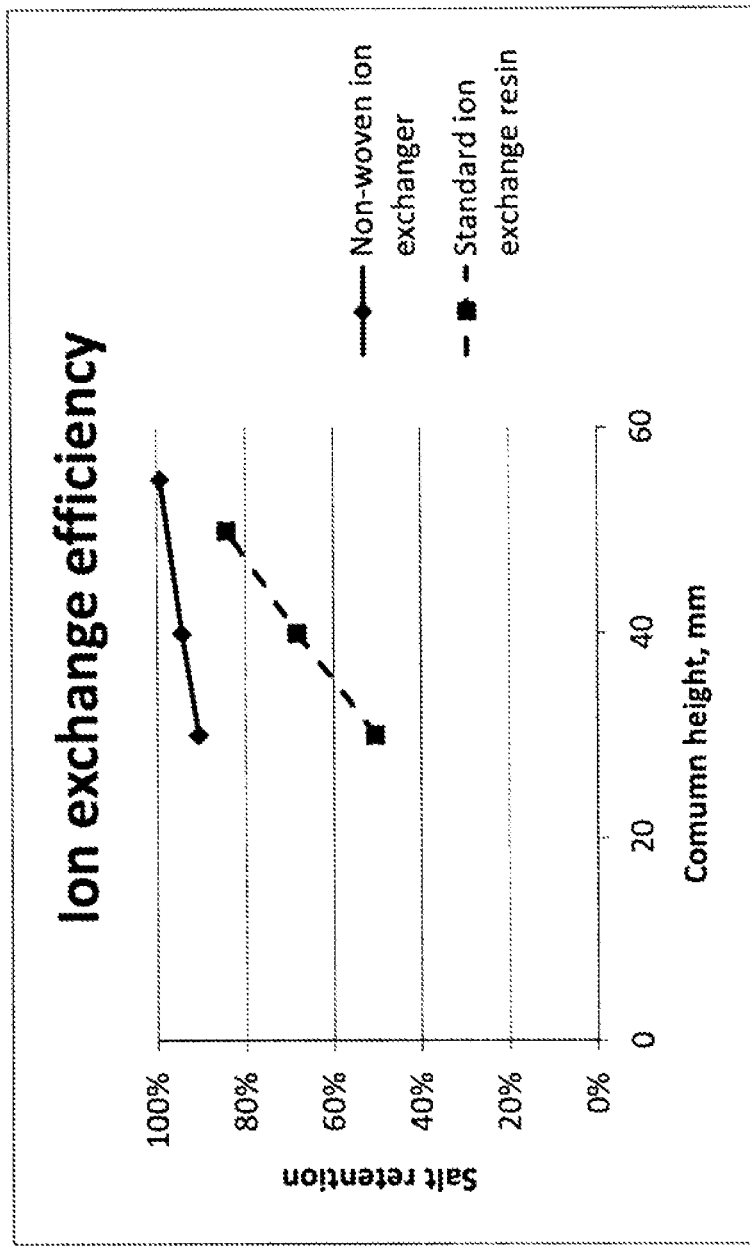
FIG. 4 is a comparison of the deionization efficiency of conventional mixed bed ion exchange resin and fibrous material as described in Example 1.

The results are shown in FIG. 4: The fibrous ion-exchange material shows considerably faster kinetics. For achieving the same deionization, the standard ion exchange resin requires a column height more than three times higher than for the fibrous media.

Example 2

Combination of Ion Exchange Resin and Fibrous Ion Exchanger

The combination of standard resin and fibrous ion exchange media is evaluated with different feed water qualities. As fibrous media the same media as in Example 1 is used. Jetpore® mixed bed resin (Merck KGaA) is used as standard resin. The flow schematic of the dynamic capacity tests is the same as described in Example 1 and FIG. 2. The test cartridges containing standard resin and fibrous media in combination are prepared in 35 mm diameter columns. For the fibrous media the configuration 7×(C+2A)+C is used. The flow rate is adjusted at LV 0.89 cm/sec or 0.5 L/min at a 35 mm test column, being equivalent to 2 L/min for a 69 mm diameter cartridge.

The initial resistivity value is read at early period of NaCl injection at target conductivity (maximum point or plateau). The NaCl dynamic capacity is calculated by retained NaCl quantity to resistivity drop down to 10 MΩ·cm. The total capacity is obtained from volumes of ion exchangers and their capacity values obtained by ASTM D2187-2009 total capacity method. The table below (Table 4) shows the test configurations and test results.

TABLE 4

| Configuration | Flow rate, L/min | Feed conductivity, µS/cm | Initial resistivity, MΩ·cm | NaCl dynamic capacity, g/cartridge | NaCl Total capacity, g/cartridge |
|---|---|---|---|---|---|
| 1) Standard resin, 8 cm | 0.5 | 5 | 13 | 1.4 | 3.3 |
| 2) Standard resin, 21 cm | 0.5 | 5 | >18 | 3.8 | 8.6 |
| 3) Standard resin 8 cm + fibrous media 1 cm | 0.5 | 1 | 18 | 1.7 | 3.4 |
| 4) Standard resin 8 cm + fibrous media 2 cm | 0.5 | 1 | 17 | 1.5 | 3.4 |
| 5) Standard resin 8 cm + fibrous media 3 cm | 0.5 | 1 | >18 | 1.9 | 3.5 |
| 6) Standard resin 8 cm + fibrous media 3 cm | 0.5 | 5 | >18 | 1.8 | 3.5 |
| 7) Standard resin 21 cm + fibrous media 3 cm | 0.5 | 5 | >18 | 5.7 | 8.8 |
| 8) Standard resin 21 cm + fibrous media 3 cm | 0.5 | 50 | >18 | 5.8 | 8.8 |

Example 3

Combination of Ion Exchange Resin and Fibrous Ion Exchanger: Configuration 5

Using standard resin alone at 8 cm height does not allow to achieve an ultrapure water quality >18 MΩ·cm. The combination with fibrous material requires a layer of at least 3 cm. Such combination achieves ultrapure water polishing at the outlet of the cartridge. The fast kinetics of fibrous media allow for the trapping of ionic leakage from the standard resin. FIG. 5 shows the result of the dynamic capacity test for configuration 5 according to Example 2 above. In this configuration the standard resin compartment allows for deionization from 1 µS/cm to >10 MΩ·cm (<0.1 µS/cm). In terms of ionic load this means that almost 1/20 of ions are to be retained by the fibrous media, while the total capacity gap between the two media is around 1/20. Ideally, for an equal media saturation and simultaneous exhaustion at the end of the cartridge lifetime, the ionic load gap should be close to the capacity gap of the media. Based on the feed water quality and the capacity gap determined from the standard resin and fibrous media specification, the target ionic leak and media quantity ratio can be calculated. For typical feed water quality of 0.5-1 MΩ·cm (typical for RO to EDI water stored in a tank) the combination of 8 cm standard resin and 3 cm fibrous resin material is optimum.

Example 4

Combination of Ion Exchange Resin and Fibrous Ion Exchanger: Configuration 7

FIG. 6 shows the result of the dynamic capacity test for configuration 7 according to Example 2 above, wherein 21 cm of standard resin are combined with 3 cm of fibrous non-woven material. The cartridge capacity is determined at the 10 MΩ·cm resistivity set point: The standard resin alone only results in a capacity equivalent of 15.2 g NaCl. This resin should have 34 g NaCl total capacity with this bed volume. The addition of 3 cm of fibrous media results in a recovery of the capacity to 22.8 g NaCl. Surprisingly, this capacity increase is not directly linked to the additional capacity of the fibrousmedia (which is estimated to be only about 0.2 g NaCl), but the media allows for accessing the residual capacity of the standard resin and thereby extending the apparent resin capacity.

Example 5

Combination of Ion Exchange Resin, Activated Carbon and Fibrous Ion Exchanger: Expansion of Configuration 5

FIG. 7 shows the results of the dynamic capacity tests for extended configuration 5 and its derivatives. In comparison to configuration 5 according to Example 2 above, wherein 8 cm of standard resin are combined with 3 cm of fibrous non-woven material, the extended model of configuration 5 comprises 11 cm of standard resin (FIG. 7A). This additional height of standard resin promises more capacity and lifetime of the cartridge.

Extended volume for standard resin can be addressed to other purification media such as activated carbon which is able to remove dissolved organics. Two further configurations in which 50% (5.5 cm+5.5 cm) and 27% (3 cm+8 cm) of 11 cm height standard ion exchange resins are replaced by Organex resin are tested. In these configurations a homogeneous mixture of standard mixed bed resin and spherical synthetic activated carbon in same average diameter is used (FIG. 7B and FIG. 7C).

Figure 7D:
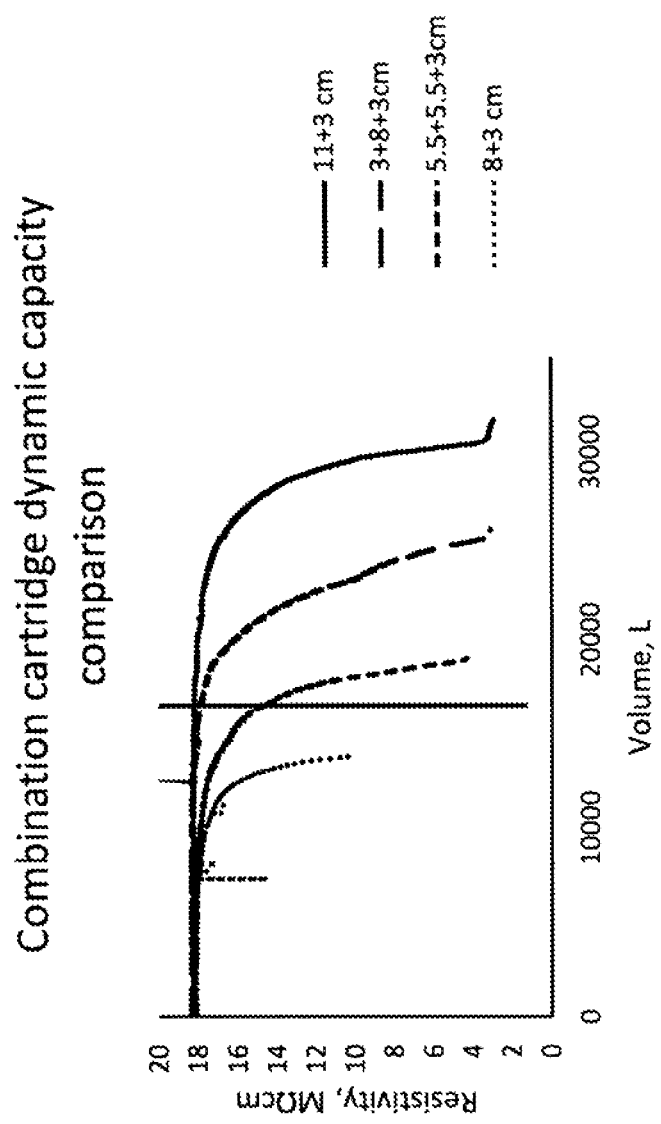
FIG. 7D compares all dynamic capacity curves including original configuration according to Example 2.

FIG. 7D compares all dynamic capacity curves in the same graph including the original configuration 5 according to Example 2.

Example 6

Impact of the Flow Rate

The flow rate is investigated by comparing a cartridge filled with standard resin only (24 cm mixed bed resin as described above) and a cartridge filled with a combination of standard resin with fibrous non-woven material (21 cm standard resin with 3 cm fibrous non-woven material, according to configuration 7 as described above). The dynamic capacity is determined as described in Example 1. For the cartridge containing standard resin a flow rate of 0.5 L/min (LV 0.22 cm/min) is used. For the combination cartridge the flow rate is 2.0 L/min (LV 0.89 cm/min). The feed water is RO water produced from municipal water in Guyancourt, France by RiOs 200 system with a conductivity range of 17-22 μS/cm and dissolved $CO_2$ around 10-15 ppm.

The result is shown in FIG. 8: The ion exchange cartridge (Quantum IX, QTUM000IX, Merck KGaA) containing only mixed bed standard ion exchange resin (Jetpore®) and supposed to produce ultrapure water can operate at a flow rate of around 0.5 L/min. At higher flow rates the resin cannot achieve >18 MΩ·cm water quality because of the lack of ion exchange kinetic. In contrast, the combination of 21 cm standard resin with 3 cm fibrous non-woven material is able to increase the resistivity to >18 MΩ·cm. Both cartridges have the same length (24 cm), but the cartridge combining standard resin with fibrous non-woven material can be operated at a much higher flow rate (4 times) without experiencing a capacity loss.

Example 7

Full Scale Experiment

The concept is also demonstrated in a full scale model with full scale cartridges on a Milli-Q® system (commercially available from Merck KGaA, Darmstadt, Germany). In this experiment the cartridge diameter is 69 mm (instead of 35 mm as in some examples above). The flow schematic is as follows: An Elix® system comprising means for RO and EDI produces pure water which is filled in a 60 L polyethylene tank. Two identically modified Milli-Q® systems with 8 cm standard resin and 3 cm non-woven fibrous material produce ultrapure water periodically. The TOC (total organic carbon) measurement is accomplished by an Anatel A-1000 TOC analyzer and conductivity cells. The flow rate is adjusted up to 2 L/min.

Resistivity:

FIG. 9 shows the resistivity determined in the experiment. The system is able to produce water of >18 MΩ·cm when it is fed with Elix® grade water (>1 MΩ·cm). The combination of the solid line (outlet of combination cartridge ("combo pack")) and broken line (intermediate resin outlet) show the resistivity on each step (standard resin, fibrous resin) and each system (L=left system, R=right system, F=feed water). If a conventional ultrapure water system is used a column of at least 24 cm is necessary in order to achieve the same water quality.

Figure 10:
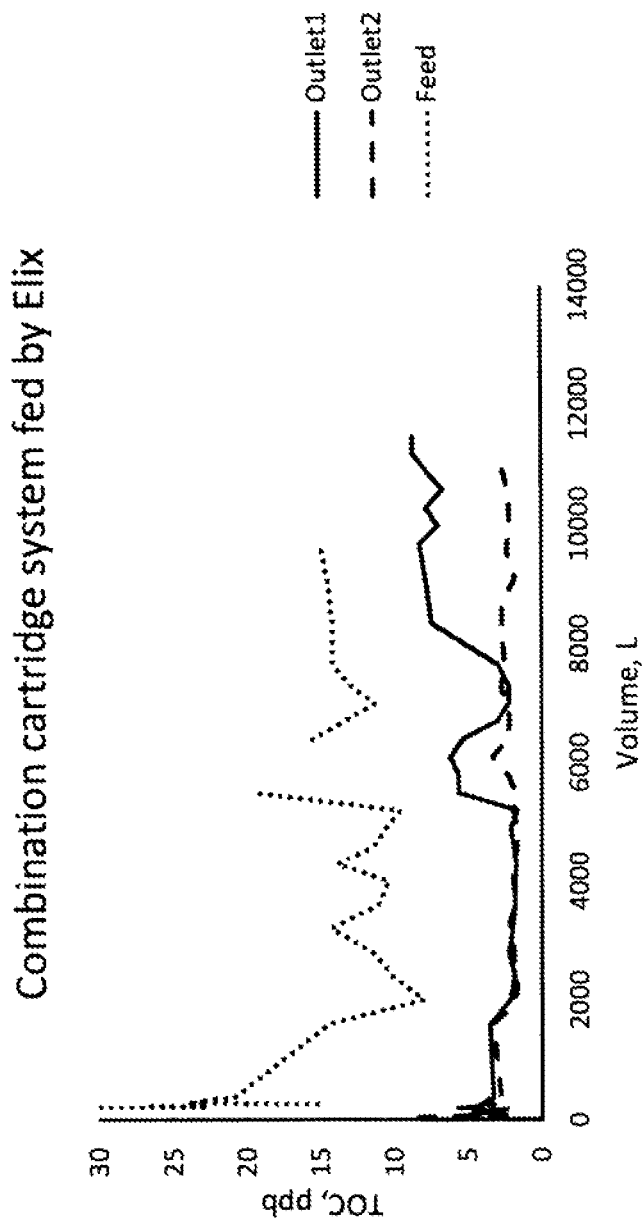
FIG. 10 shows TOC values of combination cartridges determined for a full scale model on a Milli-Q® system according to Example 7.

TOC values:

FIG. 10 shows the TOC values determined in the experiment (R=right system, L=left system, F=feed water. At the start-up TOC rinsing the initial TOC value is around 5 ppb and decreases by the rinsing effect to <5 ppb. The TOC value remains at a low level over 10000 L capacity.

Example 8

Full Scale Experiment: Comparison of Configuration 5, Extended Configuration 5 and Prior Art Combination of standard resin and fibrous media according to configuration 5 of Example 3 (8 cm standard resin+3 cm fibrous media), extended configuration 5 of Example 5 (8 cm standard resin+3 cm fibrous media) and prior art standard ion exchange cartridge (25 cm standard resin alone) are compared in a full scale test setting according to Example 7. Test cartridges are prepared in diameter 69 mm columns for combination of standard resin and fibrous media, Quantum TIX (QTUM 0TIX1, Merck KGaA) is used as prior art representative of 25 cm height standard resin.

In addition to TOC measurement, the water quality is evaluated by ion chromatography (Dionex ICS-3000) and graphite furnace atomic absorption spectrometry (Perkin Elmer AAnalyst 600) for element analysis. For microbiology related quality, microbial count is done by Milliflex system with membrane funnel (MXHAWG124) and R2A agar culture media cassette (MXSMCRA48) after 72 hours incubation at 22° C., endotoxin is determined by Limulus Amebocyte Lysate Kinetic-QCL (Lonza).

Resistivity

FIG. 11A shows the resistivity determined in the experiment. The systems with combinations of standard resin and fibrous media are able to produce water of >18 MΩ·cm when it is fed with Elix® grade water (>1 MΩ·cm) as well as prior art 25 cm standard resin alone cartridge.

Figure 11B:
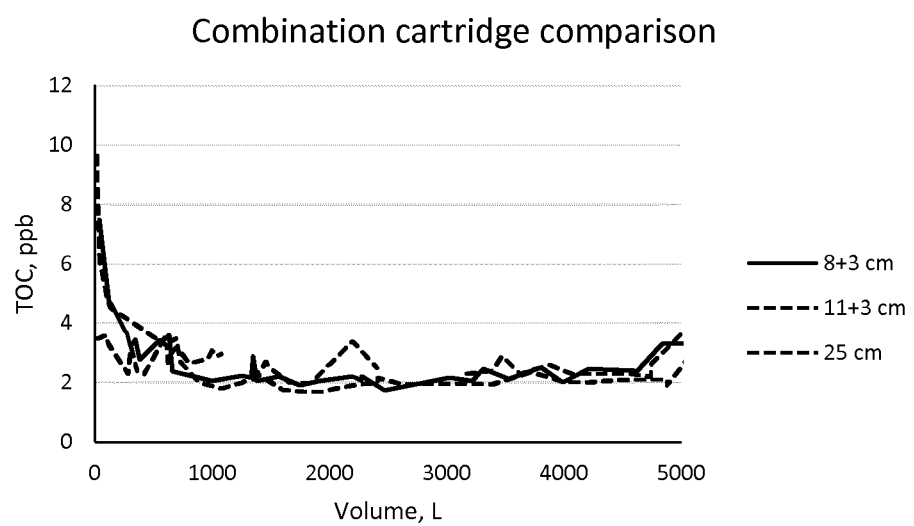
FIG. 11 shows the resistivity (FIG. 11A.1), configuration (11A.2), and TOC values (FIG. 11B) of combination cartridges determined for a full scale model on a Mill-Q® system according to Example 8.

TOC Values:

FIG. 11B shows the TOC values determined in the experiment. There is no significant difference on TOC values between the three configurations including the prior art cartridge.

Ion Chromatography Analysis:

The trace ion analysis is done by ion chromatography. The results of three major ions abundant in pure and ultrapure water are shown in the tables below (Tables 5, 6, 7).

TABLE 5

Chloride analysis by ion chromatography, all units in μg/L (ppb)

|  | 1 Invention 8 cm standard resin + 3 cm fibrous media | 2 Invention 11 cm standard resin + 3 cm fibrous media | 3 Prior art 25 cm standard resin | Feed water |
| --- | --- | --- | --- | --- |
| 550 L | <0.2 | <0.2 | <0.2 | 0.6 |
| 1250 L | <0.2 | <0.2 | <0.2 | <0.2 |
| 2100 L | <0.2 | <0.2 | <0.2 | <0.2 |
| 3000 L | <0.2 | <0.2 | <0.2 | <0.2 |
| 46000 L | <0.2 | <0.2 | <0.2 | 0.4 |

TABLE 6

Sodium analysis by ion chromatography, all units in μg/L (ppb)

|  | 1 Invention 8 cm standard resin + 3 cm fibrous media | 2 Invention 11 cm standard resin + 3 cm fibrous media | 3 Prior art 25 cm standard resin | Feed water |
| --- | --- | --- | --- | --- |
| 550 L | <0.2 | <0.2 | <0.2 | 2.0 |
| 1250 L | <0.2 | <0.2 | <0.2 | 0.8 |
| 2100 L | <0.2 | <0.2 | <0.2 | 1.0 |
| 3000 L | <0.2 | <0.2 | <0.2 | 0.9 |
| 46000 L | <0.2 | <0.2 | <0.2 | 0.5 |

TABLE 7

Pottasium analysis by ion chromatography, all units in μg/L (ppb)

|  | 1 Invention 8 cm standard resin + 3 cm fibrous media | 2 Invention 11 cm standard resin + 3 cm fibrous media | 3 Prior art 25 cm standard resin | Feed water |
| --- | --- | --- | --- | --- |
| 550 L | <0.03 | <0.03 | <0.03 | 0.60 |
| 1250 L | <0.03 | <0.03 | <0.03 | 0.09 |
| 2100 L | <0.03 | <0.03 | <0.03 | 0.28 |
| 3000 L | <0.03 | <0.03 | <0.03 | 0.13 |
| 46000 L | <0.03 | <0.03 | <0.03 | 0.08 |

GFAAS Analysis:

The following table shows the GFAAS analysis for some specific elements (Table 8):

TABLE 8

Trace elements analysis by graphite furnace atomic absorption spectrometry, sampled at 150 L, all units in μg/L (ppb)

|  | 1 Invention 8 cm standard resin + 3 cm fibrous media | 2 Invention 11 cm standard resin + 3 cm fibrous media | 3 Prior art 25 cm standard resin |
| --- | --- | --- | --- |
| Beryllium | <0.02 | <0.02 | <0.02 |
| Aluminium | 0.3 | 0.2 | 0.2 |
| Silicon | <1 | <1 | 13 |
| Chromium | <0.1 | <0.1 | <0.1 |
| Copper | <0.1 | <0.1 | <0.1 |
| Zinc | 0.3 | 0.2 | 0.1 |
| Arsenic | <0.3 | <0.3 | <0.3 |
| Selenium | <0.2 | <0.2 | <0.2 |
| Silver | <0.02 | <0.02 | <0.02 |
| Cadmium | <0.006 | <0.006 | <0.006 |
| Thalium | <0.4 | <0.4 | <0.4 |
| Lead | <0.2 | <0.2 | <0.2 |

The table below shows the result of microorganism and endotoxin levels (Table 9).

TABLE 9

Microbial contamination, sampled at 700 L

|  | 1 Invention 8 cm standard resin + 3 cm fibrous media | 2 Invention 11 cm standard resin + 3 cm fibrous media | 3 Prior art 25 cm standard resin | Feed water |
| --- | --- | --- | --- | --- |
| Bacteria count, cfu/ml | 3 | 4 | 2 | 31 |
| Endotoxin, EU/ml | <0.005 | <0.005 | <0.005 | 0.03 |

The combination cartridges comprising standard ion exchange resin and fibrous media can achieve equivalent water quality in resistivity, TOC, ions, trace elements and biological contamination index to conventional ion exchange cartridge in Milli-Q ultrapure water system condition. Without any compromise in purity of ultrapure water, the systems with the cartridges th$_{rough}$ this invention realizes compactness of cartridges.

Example 9

Weak Acid Retention of Fibrous Fibrous Material

A similar experiment as described in Example 1 is performed, wherein the feed water contains 10 ppb formate and acetate (column diameter 35 mm, standard resin bed depth 3 cm or fibrous media bed depth 3 cm (7×(C+2A)+C), flow rate 400 ml/min, 1 μS/cm equivalent, LV =0.69 cm/sec). The result is shown in FIG. 12: Weakly dissociated organic acids as formate and acetate show faster exchange kinetics with fibrous material than with standard resin. The fibrous material retains better the acetate and formate under challenging conditions. Such components are difficult to remove from ultrapure water by conventional mixed bed resins. Plastic components of the water system may however potentially release such organics. Therefore the retention ability of the fibrous material at the polishing step may be of great value.

Example 10

Combination of Ion Exchange Resin and Fibrous Ion Exchanger

Examples 1, 2 and 3 are repeated using different fibrous ion exchange material (Institute of Physical Organic Chemistry of the National Academy of Science of Belarus. This material, similar to the material used in Example 1, is processed by irradiation initiated graft polymerization to introduce ion exchange fuctional groups on polypropylene fibers. Fibrous substrate is a needle punched non-woven fabric. The thickness is 3 to 12 mm (instead of 1 to 2 mm). The capacity density (meq/g) is similar. The ion exchange capacities for dried anion exchanger and cation exchanger are 2.5 meq/g and 2.6 meq/g, respectively. Since characteristic of this media is different from the one in previous examples, media arrangement is optimized by capacity equilibrium rule and anion/cation sandwich configuration. Media are treated by the same procedure as described in Example 1 for disc preparation, regeneration and purification. Configuration 5 in Example 2 (8 cm standard resin+ non-woven media combination) and 3 are reproduced with this media in a ¼ scale model (Table 10).

TABLE 10

| | Configuration | Number of discs C | Number of discs A | H, mm |
|---|---|---|---|---|
| Invention 1 Example 1 | Sandwich 7 × (C + 2A) + C | 8 | 14 | 30 |
| Invention 2-1 | Sandwich 5 × (C + A)) + C | 6 | 5 | 30 |
| Invention 2-2 | Sandwich 6 × (C + A)) + C | 7 | 6 | 38 |
| Invention 2-3 | Sandwich 7 × (C + A)) + C | 8 | 7 | 45 |

The reproduction of the performance as shown in Example 2 is possible if the capacity equilibrium rule is respected, as can be seen in FIG. 13.

The invention claimed is:

1. A method comprising a step (a) of passing water through a mixed bed ion exchanger comprising beads having a diameter between 0.5 and 0.7 mm and a step (b) of passing said water through a fibrous ion-exchange material,
    wherein said mixed bed ion exchanger comprises a mixture of anion exchange particles in the form of said beads and cation exchange particles in the form of said beads,
    said anion exchange particles and said cation exchange particles are monodisperse, respectively, and
    wherein said fibrous ion-exchange material is a non-woven fibrous ion-exchange material and is arranged in layers, each said layer having a thickness of 1 mm up to 5 mm, said layers comprise either cation or anion exchange groups, and said layers comprising said cation-exchange groups and said layers comprising said anion-exchange groups being arranged in blocks, wherein said blocks are arranged as follows:
    7×(C+2A)+C, 9×(C+2A)+C, 9×(C+3A)+C or 13×(C+2A)+C, wherein C is a layer of the cation-exchange groups and 2A is two consecutive layers of the anion-exchange groups, and 3A is three consecutive layers of the anion-exchange groups.
2. A method according to claim 1, wherein said method produces ultrapure water.
3. A method according to claim 1 wherein step (a) is performed before step (b).
4. A method according to claim 1, wherein the mixed bed ion exchanger is based on styrene divinylbenzene co-polymer.
5. A method according to claim 1, wherein the layers of the fibrous ion-exchange material comprising said cation-exchange groups comprise a substrate into which the cation-exchange groups have been introduced by radiation-induced graft polymerization and wherein the layers comprising said anion-exchange groups comprise a substrate into which the anion-exchange groups have been introduced by radiation-induced graft polymerization.
6. A method according to claim 1, wherein the fibrous ion-exchange material is based on polypropylene substrate into which sulfonic groups or quaternary ammonium groups have been introduced by radiation-induced graft polymerization.
7. A method according to claim 1, wherein a ratio of a volume of the mixed bed ion exchanger to a volume of the fibrous ion-exchange material is between 10:1 and 1:5.
8. A method according to claim 1, wherein the method comprises a further step (c) of passing said water through an activated carbon bed.
9. A method according to claim 1, wherein the method comprises a further step (d) of treating said water by reverse osmosis and/or a further step (e) of treating said water by electrodeionization, wherein step (d) and step (e) are performed prior to steps (a) and (b).
10. A module comprising a mixed bed ion exchanger comprising beads having a diameter between 0.5 and 0.7 mm and a fibrous ion-exchange material,
    wherein said mixed bed ion exchanger consists of a mixture of anion exchange particles in the form of said beads and cation exchange particles in the form of said beads,
    said anion exchange particles and said cation exchange particles are monodisperse, respectively, and
    wherein said fibrous ion-exchange material is a non-woven fibrous ion-exchange material and is arranged in layers, each said layer having a thickness of 1 mm up to 5 mm, said layers comprise either cation or anion exchange groups, and said layers comprising said cation-exchange groups and said layers comprising said anion-exchange groups being arranged in blocks, wherein said blocks are arranged as follows:
    7×(C+2A)+C, 9×(C+2A)+C, 9×(C+3A)+C or 13×(C+2A)+C, wherein C is a layer of the cation-exchange groups and 2A is two consecutive layers of the anion-exchange groups, and 3A is three consecutive layers of the anion-exchange groups.
11. A module according to claim 10, wherein the mixed bed ion exchanger is based on styrene divinylbenzene co-polymer.
12. A module according to claim 10, wherein said module further comprises an activated carbon bed.
13. A water treatment system comprising a mixed bed ion exchanger comprising beads having a diameter between 0.5 and 0.7 mm and a fibrous ion-exchange material,
    wherein said mixed bed ion exchanger consists of a mixture of anion exchange particles in the form of said beads and cation exchange particles in the form of said beads,
    said anion exchange particles and said cation exchange particles are monodisperse, respectively, and
    wherein said fibrous ion-exchange material is a non-woven fibrous ion-exchange material and is arranged in layers, each said layer having a thickness of 1 mm up to 5 mm, said layers comprise either cation or anion exchange groups, and said layers comprising said cation-exchange groups and said layers comprising said anion-exchange groups being arranged in blocks, wherein said blocks are arranged as follows:

$7\times(C+2A)+C$, $9\times(C+2A)+C$, $9\times(C+3A)+C$ or $13\times(C+2A)+C$, wherein C is a layer of the cation-exchange groups and 2A is two consecutive layers of the anion-exchange groups, and 3A is three consecutive layers of the anion-exchange groups.

14. A water treatment system according to claim 13, wherein the mixed bed ion exchanger and the fibrous ion-exchange material are provided in a single module comprising said mixed bed ion exchanger comprising said beads having a diameter between 0.5 and 0.7 mm and said fibrous ion-exchange material.

15. A water treatment system according to claim 13, wherein the mixed bed ion exchanger and the fibrous ion-exchange material are provided in at least two modules.

16. A water treatment system according to claim 13, further comprising an activated carbon bed.

17. The water treatment system according to claim 16, wherein said activated carbon bed is mixed with said mixed bed ion exchanger.

* * * * *